United States Patent
Murata et al.

(10) Patent No.: US 6,777,070 B1
(45) Date of Patent: Aug. 17, 2004

(54) ANTIREFLECTION MATERIAL AND POLARIZING FILM USING THE SAME

(75) Inventors: Chikara Murata, Shizuoka (JP); Kazuya Ohishi, Shizuoka (JP); Yasuhiro Matsunaga, Shizuoka (JP); Tomohisa Yamamoto, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/581,447

(22) PCT Filed: Oct. 14, 1999

(86) PCT No.: PCT/JP99/05668
§ 371 (c)(1),
(2), (4) Date: Jul. 21, 2000

(87) PCT Pub. No.: WO00/22461
PCT Pub. Date: Apr. 20, 2000

(30) Foreign Application Priority Data

Oct. 14, 1998 (JP) ............................................. 10/291757
Nov. 12, 1998 (JP) ............................................. 10/322604
Dec. 4, 1998 (JP) ............................................. 10/345420
Oct. 7, 1999 (JP) ............................................. 11/286321

(51) Int. Cl.[7] ...................... B32B 25/02; B32B 27/28; B32B 27/30; B32B 27/40
(52) U.S. Cl. .................... 428/323; 428/423.1; 428/500; 428/522; 525/454; 525/455; 526/284; 526/301
(58) Field of Search ................................. 428/323, 402, 428/403, 404, 500, 522, 423.1; 525/454, 455; 526/284, 301

(56) References Cited

U.S. PATENT DOCUMENTS 4,735,869 A * 4/1988 Morita ........................ 428/702
5,747,152 A * 5/1998 Oka et al. .................... 428/323

FOREIGN PATENT DOCUMENTS

| EP | 854202 A2 | 7/1998 |
| JP | 4-337307 A | 11/1992 |
| JP | 08-056398 | * 9/1997 |
| JP | 9-241340 A | 9/1997 |
| JP | 10-239502 A | 9/1998 |

* cited by examiner

Primary Examiner—Paul J. Thibodeau
Assistant Examiner—Nikolas J. Uhlir
(74) Attorney, Agent, or Firm—Scully, Scott, Murphy & Presser

(57) ABSTRACT

An anti-reflection material and a polarization film which exhibit superior anti-reflection properties by preventing external light such as sunlight, fluorescent light, etc., from being reflected on a display, which yield a clear image without sparkling and reduces image contrast, and which exhibit superior wear resistance, chemical resistance, and contamination resistance, as well as exhibit optical stability. A hard coat layer is provided on one surface or two surfaces of a transparent substrate directly or via another layer, and an anti-reflection film having a lower refraction index than the hard coat layer is further provide on the hard coat layer. The hard coat layer consists of at least ① a polymer polymerizing (metha)acrylate compound having a fluorene structure; ② a polymer polymerizing urethane (metha) acrylate compound and ultrafine particles having a high refraction index; and ③ radiation and/or thermosetting resin and surface-treated titanium oxide ultrafine particles.

4 Claims, 2 Drawing Sheets

ANTIREFLECTION MATERIAL AND POLARIZING FILM USING THE SAME

TECHNICAL FIELD

The present invention relates to an anti-reflection material and to a polarization film employing the anti-reflection material, suitable for use in displays such as liquid crystal displays (LCDs), plasma displays (PDPs), CRTs, ELs, etc., and in particular, relates to an anti-reflection material and to a polarization film employing the anti-reflection material, having superior light resistance, contamination resistance on image display surfaces, anti-reflection properties, chemical resistance, and wear resistance.

BACKGROUND ART

Displays typified by LCDs, PDPs, CRTs, and ELs are widely used in various fields such as television and computer technologies, and have been rapidly developed. Recently, it is desirable that the above displays be used in cellular phones, PHS devices, and other portable terminals.

As a display for portable terminals, it is believed that liquid crystal displays, that are light, compact, and suitable for general use, may come to monopolize the market. Portable terminals containing touch-panels, to which a plastic pen or a finger directly contacted for operation, have been widely used. Therefore, requirements for wear resistance, chemical resistance, and contamination resistance have become stricter than ever. Furthermore, requirements for anti-reflection, that is, preventing the external lights such as sunlight, fluorescent light, and the like from being reflected by a display when the display is used in lighted conditions, such as outdoors, has become stricter than ever. These requirements extend not only to portable terminals but also to various types of displays from small to large.

In order to solve this problem, a method for suppressing the reflectivity of most of the surface of a display was developed by forming a multilayer composition consisting of two or more layers in which a layer having a high refractive index and a layer having a low refractive index are alternately laminated on the surface of the display, and in which most of the surface layer is a layer having a low refractive index. As a material for the layer having a low refractive index, $MgF_2$, $SiO_2$, etc., can be employed. As a material for the layer having a high refractive index, $TiO_2$, $ZrO_2$, etc., can be employed. These materials usually are laminated by a gas phase method such as vapor deposition, sputtering, etc., a sol-gel method, or the like. However, there were problems in cost, since with respect to the gas phase method, apparatus for manufacturing is very expensive and the manufacturing is not suitable in a large area, and with respect to the sol-gel method, coating and burning are repeatedly carried out. In addition, a method for low cost production, in which a film is formed by the coating material containing these materials, using roll coating, printing, etc., has also been proposed. However, there was a problem in color nonuniformity (interference nonuniformity), since the method can not control the film thickness to a precision of 10 nm and the properties are thereby obtained.

In the case in which an anti-reflection film provided with an anti-reflection layer as described above on a transparent substrate such as polyethylene terephthalate (PET) is used by adhering on the surface of a touch panel operated by directly touching pen or finger, high wear resistance, high chemical resistance, and high contamination resistance are required. In order to satisfy these properties, generally, a hard coat layer is provided between the above transparent substrate and the above anti-reflection layer. It is necessary to also control the refractive index in the hard coat layer in order to improve anti-reflection properties of the anti-reflection film.

Optically, by increasing the refractive index of the hard coat layer and by providing a low refractive index layer consisting of conventional silica, etc., on the hard coat layer, an anti-reflection material having some range of properties can be obtained and the layer composition of the anti-reflection material can be simplified. Furthermore, in this case, severely controlled film layer thickness is limited only to a low refractive index layer, and the anti-reflection material can be thereby produced by the above roll coating or by printing.

As resins used in the hard coat layer constituting the anti-reflection material according to the conventional techniques, transparent thermosetting resins, thermoplastic resins, radiation-curing-type resins, etc., have been employed. In addition, hardeners such as crosslinking agents, polymerization initiators, etc., polymerization promotors, solvents, viscosity modifiers, etc., have been added to this resin as necessary. In order to increase the refractive index of this hard coat layer, a method for adding the ultrafine particles having a high refractive index to the above binder resin has been proposed. As a processing method, a method in which a coating material is mixed with the above resin and ultrafine particles with additives and solvents, and is coated by coater or printing, can be used. According to these methods, the refractive index of the hard coat layer can be controlled to some extent by the content of the above ultrafine particles. However, when the content is too high, problems occur in that transparency is reduced and that durability such as wear resistance, chemical resistance, etc., is deteriorated. In addition, there was also a problem in that as the content of the above ultrafine particles increased, the ultrafine particles aggregated with each other in the film forming process, coarse particles formed, and transparency was thereby substantially reduced.

Therefore, in such case, in order to suppress the content of filler, it is desirable that ① resin having a high refractive index be employed as binder resin, ② binder resin having superior dispersibility of the ultrafine particle be employed, and ③ ultrafine particles having the highest possible refractive index be selectively employed.

As binder resin having a high refractive index, resin containing aromatic rings, halogens other than F, or components having high refractive index such as S, N, P, etc., can be employed. However, when the refractive index of the above resin increases, there is a problem in stability of the coating material, and in addition, it easily weakens, and there are problems also in excoriation resistance, light resistance, coloring, etc. Therefore, under present circumstances, suitable material has not been available as a material for forming a hard coat layer having both high refractive index and durability.

As a ultrafine particle having high refractive index, titanium oxide which is inexpensive and which has superior safety, is generally employed; however, in this case, the hard coat layer becomes white and hazy over time due to a photocatalytic effect of the titanium oxide, and there was a problem in the light resistance. Furthermore, since the photocatalytic effect of the titanium oxide is dependent on the amount of ultraviolet radiation, the hard coat layer becomes remarkably hazy and white in outdoor use, and there was a problem in practice.

Thus, according to the conventional anti-reflection material, it is very difficult to provide both high refractive index of the hard coat layer and durability of the surface of the anti-reflection material such as wear resistance, chemical resistance, light resistance, etc., and an anti-reflection material having sufficient properties did not exist until now.

DISCLOSURE OF INVENTION

Therefore, the present invention has been made in view of the above circumstances, and it is an object thereof to provide an anti-reflection material which can exhibit superior anti-reflection properties by preventing external light such as sunlight, fluorescent light, etc., from being reflected on a display, which can yield a clear image without sparkling and reducing image contrast, and which has superior durability even if it is employed in displays, touch panels, etc., for outdoor use, as well as exhibits superior light resistance, chemical resistance, and wear resistance, by providing a multi-layer structure with a hard coat layer having a high refractive index and superior durability. In addition, it is also an object thereof to provide a polarization film employing the above anti-reflection material, and in particular, performance of full color liquid crystal display is thereby drastically improved.

The inventors have conducted various research with regard to resin as a main component of the hard coat layer in order to simultaneously improve refractive index and strength of the hard coat layer, and have found that the refractive index of binder resin is increased very effectively by containing a (metha)acrylate compound having a fluorene structure in the resin as a polymerizing component. Therefore, an anti-reflection film according to a first embodiment of the present invention has been made on the basis of the above knowledge, and it is characterized by comprising a transparent substrate, a hard coat layer provided on one surface or two surfaces of the transparent substrate directly or via another layer, and an anti-reflection film having a lower refractive index than the hard coat layer further provided on a surface of the hard coat layer, wherein the hard coat layer consists of a polymer polymerizing at least the (metha)acrylate compound having a fluorene structure.

In addition, the inventors have conducted various research with regard to the dispersibility of ultrafine particles having a high refractive index in the hard coat layer, durability such as wear resistance of the hard coat layer, etc., and have found that the transparency and the durability are improved very effectively by combining specific compounds and ultrafine particles having a high refractive index. Therefore, an anti-reflection film according to a second embodiment of the present invention has been made on the basis of the above knowledge, and it is characterized by comprising a transparent substrate, a hard coat layer provided on one surface or two surfaces of the transparent substrate directly or via another layer, and an anti-reflection film consisting of one layer or multi-layer adjusted refractive index further provided on a surface of the hard coat layer, wherein the hard coat layer consists of at least a polymer polymerizing urethane(metha)acrylate compound and ultrafine particles having a high refractive index.

Furthermore, the inventors have conducted various research with regard to resin as a main component of hard coat layer in order to achieve superior anti-reflection properties by increasing the refractive index of the hard coat layer and to improve durability of the hard coat layer, and have found that the properties are improved very effectively by combining radiation and/or thermosetting resin and titanium oxide ultrafine particles surface-treated by an oxide or a hydroxide of at least one element chosen from silicon, zirconium, aluminum, tin, and cesium. Therefore, an anti-reflection film according to a third embodiment of the present invention has been made on the basis of the above knowledge, and it is characterized by comprising a transparent substrate, a hard coat layer provided on one surface or two surfaces of the transparent substrate directly or via another layer, and an anti-reflection film further provided on a surface of the hard coat layer, wherein the hard coat layer consists of at least radiation and/or thermosetting resin and titanium oxide ultrafine particles surface-treated by an oxide or a hydroxide of at least one element chosen from silicon, zirconium, aluminum, tin, and cesium.

In the following, preferable embodiments of the present invention will be explained in detail. The first embodiment through the third embodiment of the present invention are formed of the same compositions and structures, except that the compositions of hard coat layers thereof are different.

(1) Anti-reflection Material

A. Transparent Substrate

As a transparent substrate employed in an anti-reflection material according to the present invention, a conventional transparent film, glass, etc., can be employed. Specifically, various resin films such as polyethylene terephthalate (PET), polyethylene naphthalate (PEN), triacetyl cellulose (TAC), polyacrylate, polyimide, polyether, polycarbonate, polysulfone, polyether sulfone, cellophane, aromatic polyamide, polyethylene, polypropylene, polyvinyl alcohol, and the like, and glass base materials such as fused glass, soda glass, and the like can be preferably employed. For PDPs and LCDs, PET and TAC are preferred.

The higher the transparency of the transparent substrate, the better the transparent substrate. The light transmittance (Japanese Industrial Standard C-6714) is preferably 80% or more, and is more preferably 90% or more. In the case in which the transparent substrate is employed in a compact and light-weighting liquid-crystal display, the transparent substrate is preferably in the form of a film. It is desirable that the transparent substrate be thin from the standpoint of being light-weight, and it is preferred that the thickness of the transparent substrate be preferably 1 to 700 $\mu$m, and more preferably 25 to 250 $\mu$m in consideration of the productivity thereof.

In addition, the adhesion between the transparent substrate and the hard coat layer, or other layer, can be improved by surface-treatment of the transparent substrate such as an alkaline treatment, corona treatment, plasma treatment, fluorine treatment, sputtering treatment, or the like, a coating, on the transparent substrate, of a surface active agent, a silane coupling agent, or the like, or a surface-modification-treatment such as an Si deposition or the like. As a surface-treatment of the transparent substrate, a treatment in which a surface of the transparent substrate is uniformly coated by inorganic materials such as a silicon compound, a titanium compound, etc., is preferred from the viewpoint of improving the light resistance.

Furthermore, on the surface of the transparent substrate, an anti-static layer may be provided in order to prevent contaminants such as dust statically adhering on a display surface. The anti-static layer can be formed by depositing or sputtering an extremely thin layer of a metal oxide such as ITO or a metal such as aluminum or tin; by dispersing whiskers and metal microparticles such as of aluminum or tin, whiskers and microparticles such as antimony-doped metal oxide such as tin oxide, fillerized charge-transfer complexes produced between an electron donor such as an organic cation or a metal ion and 7,7,8,8-tetracyanoxydimethane in a polyester resin, an acrylic resin, an epoxy resin, or the like, and subsequently solvent-coating; by solvent-coating a camphor-sulfonic-acid-doped polypyrrol, polyaniline, etc.; or the like. The light permeability of the anti-static layer is preferably 80% or more in the case of optical use.

B. Hard Coat Layer

Next, a hard coat layer according to the present invention is explained. In the present invention, "hard coat" refers to having a hardness of H or more according to the pencil hardness test (Japanese Industrial Standard K-5400). In addition, in the present invention, "high refractive index and low refractive index" refer to relative relationships between refractive indexes of adjoined layers.

① First Embodiment

In resin constituting in a hard coat layer of the first embodiment according to the present invention, a polymer polymerized from polymerizing components consisting of at least a (metha)acrylate compound having a fluorene structure shown in the following chemical formula 1 and/or a (metha)acrylate compound having a fluorene structure shown in the following chemical formula 2 (A component) by using polymerization initiator, is contained. In particular, it is preferably a copolymer polymerized from copolymerizing components in which urethane (metha)acrylate compound shown in the following chemical formula 3 and/or urethane (metha)acrylate compound shown in the following chemical formula 4 (B component) is used jointly with this (metha)acrylate compound, as a copolymerization component. In the following, these chemical components will be explained.

b refer to integers of 1 to 5; k refers to integers of 2 to 5; l refers to integers of 2 to 3; m refers to integers of 1 to 2; and n refers to integers of 2 to 6.

As a (metha)acrylate compound having a fluorene structure of the above A component, both chemical compounds shown in the chemical formulas 1 and 2 can be employed. In particular, it is preferably the most fundamental chemical compound in which a and b are 1, and $R_1$ and $R_2$ are hydrogen atoms in chemical formula 1.

As an urethane (metha)acrylate compound of the above B component, both chemical compounds shown in the chemical formulas 3 and 4 can be employed. The urethane (metha)acrylate compound of chemical formula 3 is a chemical compound having at least four (metha)acrylate groups which is selected from reaction products of (metha)acrylate compound including a hydroxyl group and an isocyanate compound. The urethane (metha)acrylate compound of chemical formula 4 is a chemical compound having at least four (metha)acrylate groups which is selected from reaction products of a (metha)acrylate compound including hydroxyl groups, isocyanate compounds, and polyol compounds. In addition, as a method for obtaining the above urethane (metha)acrylate, any well-known method can be employed.

As a (metha)acrylate compound including hydroxyl groups, glycerin di(metha)acrylate, trimethylolpropane di(metha)acrylate, pentaerythritol tri(metha)acrylate, ditrimethylolpropane di(metha)acrylate, dipentaerythritol penta(metha)acrylate, etc., can be employed. These may be employed alone or in combination.

As an isocyanate compound, o-tolyl isocyanate, p-tolyl isocyanate, 4-diphenyl-methane isocyanate, 2,4-tolylene diisocyanate, 2,6-tolylene diisocyanate, 4,4-diphenyl- Chemical Formula 1

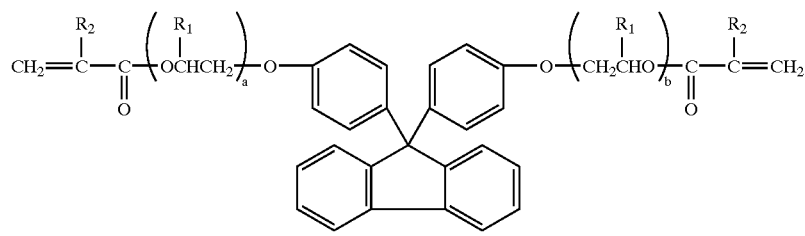

Chemical Formula 2

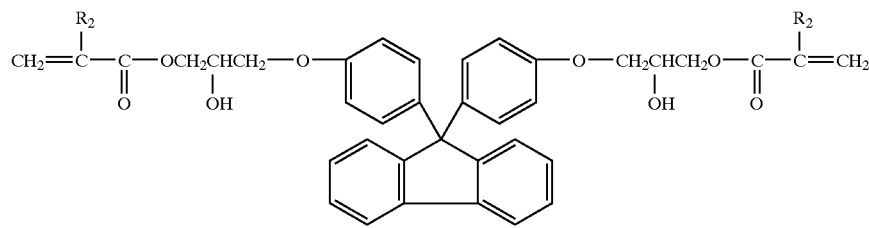

Chemical Formula 3

Chemical Formula 4

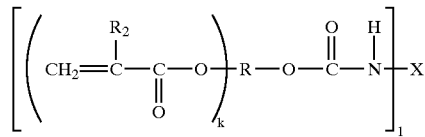
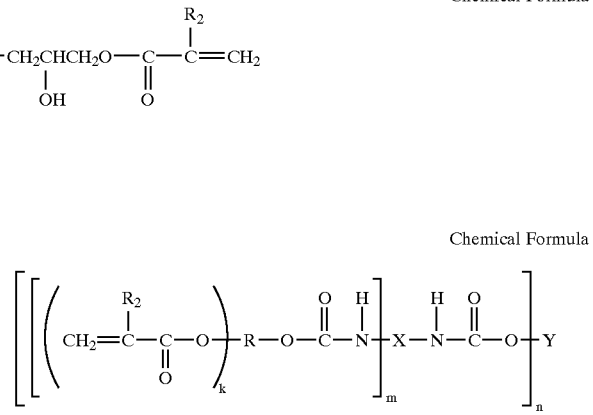

In the chemical formulas, R refers to a polyhydric alcohol group; $R_1$ refers to a hydrogen atom, $CH_3$ or $C_2H_5$; $R_2$ refers to a hydrogen atom or $CH_3$; X refers to a component, excluding isocyanate groups, from an organic isocyanate compound; and Y refers to a polyhydric alcohol group a and methane diisocyanate, m-xylylene diisocyanate, p-xylylene diisocyanate, tetramethyl xylylene diisocyanate, biphenylene diisocyanate, 1,5-naphthylene diisocyanate, o-tolidine diisocyanate, hexamethylene diisocyanate, 4,4'-methylene biscyclohexyl isocyanate, isophorone diisocyanate, trimethyl hexamethylene diisocyanate, 1,3-(isocyanate methyl)cyclohexane, polycondensates of burete compounds or nulate compounds thereof, etc., can be employed. These may be employed alone or in combination. In particular, tolylene diisocyanate, xylylene diisocyanate, nulate compounds of hexamethylene diisocyanate, nulate compounds of isophorone diisocyanate, etc., can be preferably employed.

As polyol compounds, aliphatic polyhydric alcohols such as ethylene glycol, propylene glycol, neopentyl glycol, 1,6-hexanediol, glycerol, trimethylolpropane, polyol including carboxylic acid, etc., aromatic polyhydric alcohols such as ethylene oxide and propylene oxide reactants of various bisphenol, ethylene oxide and propylene oxide reactants of bisphenol fluorene, etc., aliphatic or aromatic polyol having a (metha)acryloyl group in the molecule shown in the chemical formula 2, can be employed. In particular, dimethylol propionic acid, dimethylol butanoic acid, bisphenoxyethanol fluorene, etc., can be preferably employed.

As a compound in addition to the above compounds, for controlling properties of coating material and coating film such as viscosity, cross-link density, heat-resistance, chemical resistance, etc., composite appropriately mixed monomers, oligomers, or prepolymers having a polymeric unsaturated bonding such as acryloyl group, methacryloyl group, acryloyloxy group, methacryloyloxy group, etc., can be employed. As a monomer, acrylic acid derivatives of monofunctional acrylates such as styrene, methyl acrylate, cyclohexyl acrylate, lauryl acrylate, ethoxy diethylene glycol acrylate, methoxy triethyleneglycol acrylate, phenoxy ethylacrylate, tetrahydrofurfuryl acrylate, isobornyl acrylate, 2-hydroxyethyl acrylate, 2-hydroxypropyl acrylate, 2-hydroxy-3-phenoxy acrylate, etc.; and of multifunctional acrylate such as ethylene glycol diacrylate, neopentylglycol diacrylate, 1,6-hexanediol diacrylate, trimethylolpropane triacrylate, pentaerythritol triacrylate, pentaerythritol acrylate, dipentaerythritol hexiaacrylate, trimethylolpropane acrylic acid benzoate, trimethylolpropane benzoate, etc.; methacrylic acid derivatives of monofunctional methacrylate such as methyl methacrylate, 2-ethylhexyl methacrylate, n-stearyl methacrylate, cyclohexyl methacrylate, tetrahydrofurfuryl methacrylate, methoxy polyethylene methacrylate, phenoxyethyl methacrylate, 2-hydroxyethyl methacrylate, 2-hydroxybutyl methacrylate, etc.; and of multifunctional mathacrylate such as 1,6-hexanediol dimethacrylate, ethylene glycol dimethacrylate, trimethylolpropane trimethacrylate, glycerol dimethacrylate, etc.; or the like, can be employed. As an oligomer and a prepolymer, acrylates such as polyester acrylate, polyurethane acrylate, epoxy acrylate, polyether acrylate, alkyd acrylate, melamine acrylate, silicon acrylate, etc.; unsaturated polyester; epoxy type compound; or the like, can be employed. These may be employed alone or in combination. In the case in which a cured film is required to have flexibility, the content of monomers is preferably lowered, and in order to further decrease the crosslinking density, monomers of the monofunctional or the bifunctional (metha)acrylate type is preferably employed. In contrast, in the case in which the cured film is required to have extreme durability such as heat resistance, wear resistance, solvent resistance, etc., it is preferable that the content of the monomers be increased and that monomers which are trifunctional or greater of the (metha)acrylate type be employed.

As a thermosetting resin which can be used in the hard coat layer, phenol resin, furan resin, xylene-formaldehyde resin, ketone-formaldehyde resin, urea resin, melamine resin, aniline resin, alkyd resin, unsaturated polyester resin, epoxy resin, etc., can be employed. These may be employed alone or in combination. In the case in which a transparent substrate consists of plastics, a heat curing temperature cannot be set at a high temperature. In particular, in the case in which PET or TAC is employed, a thermosetting resin which can be cured at 100° C. or less, is desirably employed.

The refractive index of the resin for forming the above hard coat layer is increased by raising the proportion of the A component, and even greater excoriation resistance is obtained by using the B component jointly. However, if the proportion of the B component is increased in order to improve the excoriation resistance, the refractive index is lowered. Therefore, as a mixture ratio of the A component and the B component, it is preferable that the A component be 20 to 90 weight parts and that the B component be 80 to 10 weight parts when the total of both components is 100 weight parts. In particular, it is more preferable that the A component be 50 to 80 weight parts and that the B component be 50 to 20 weight parts.

Any polymerization initiator in which active radicals are generated by emissions such as heat, visible light, ultraviolet light, etc., can be employed without any limitation. As a polymerization initiator which generates active radicals by heat, azo compounds such as 2,2'-azobis(2,4-dimethyl valeronitrile), etc., organic peroxides such as benzoyl peroxide, lauroyl peroxide, etc., or the like can be employed. As a polymerization initiator which generates active radicals by emissions, acetophenones such as 2,2-dimethoxy-2-phenyl acetophenone, diethoxy acetophenone, 2-hydroxy-2-methyl-1-phenylpropane-1-one, benzyl dimethyl ketal, 1-hydroxy cyclohexyl-phenylketone, 2-methyl-2-morpholino(4-thiomethylphenyl)propane-1-one, etc., benzoin ethers such as benzoin methylether, benzoin ethylether, benzoin isopropylether, benzoin isobutylether, etc., benzophenones such as benzophenone, o-benzoyl methylbenzoate, 4-phenyl benzophenon, 4-benzoyl-4'-methyl-diphenylsulfide, 4-benzoyl-N,N-dimethyl-N-[2-(1-oxo-2-propenyloxy) ethyl] benzene methanaminuim bromide, (4-benzoylbenzyl) trimethyl ammonium chloride, etc., thioxanthones such as 2,4-diethyl thioxanthone, 1-chloro-4-dichloro thioxanthone, etc., 2,4,6-trimethylbenzoyl diphenylbenzoyl oxide, cationic polymerization initiators shown in the following chemical formula 5, or the like can be employed. These can be employed alone or in combination.

Chemical Formula 5

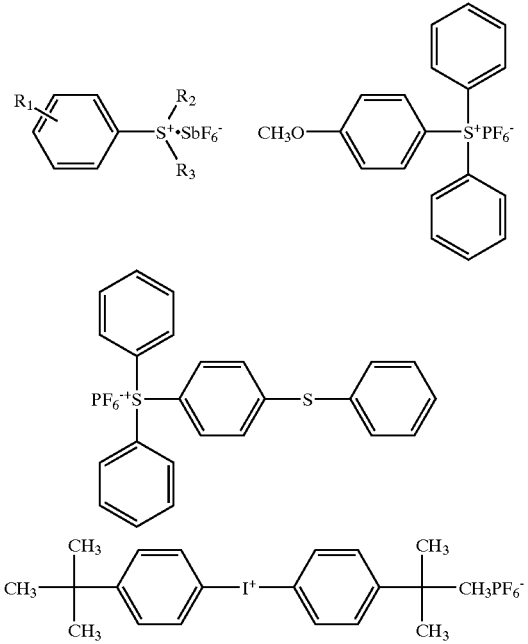

-continued

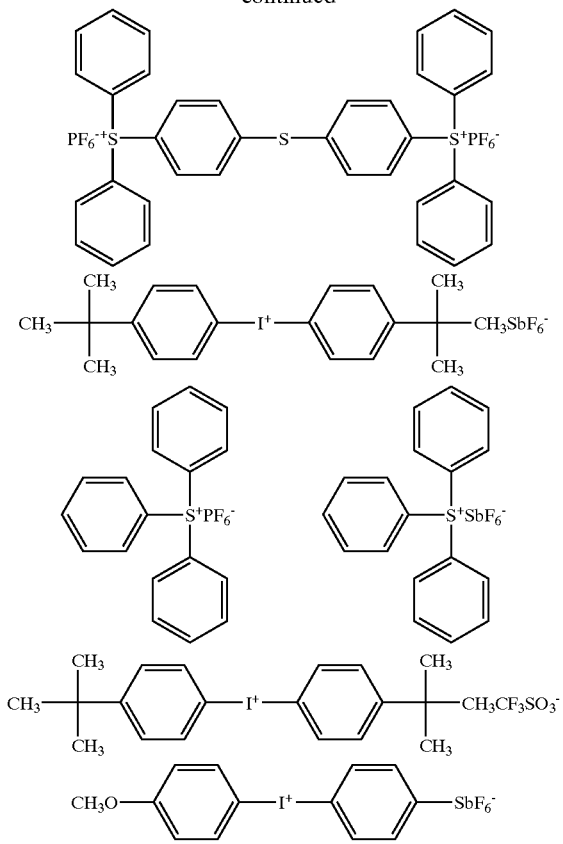

In addition, as an accelerator (sensitizer), an amine-type compound such as N,N-dimethyl paratoluidine, 4,4'-diethylamino benzophenone, etc., can be employed in combination. In this case, the amount of the accelerator added is preferably in the range of 0.1 to 5.0% by weight to resin components.

In the resin for forming the above hard coat, when the total amount of the A component and the B component is 100 weight parts, a compounding ratio of the polymerization initiator is preferably 0.01 to 5 weight parts to the total amount of 100 weight parts, and is more preferably 1 to 3 weight parts. In the case in which the initiator is in excess, some degradation products of the unreacted polymerization initiator result in reduction of the layer strength and discoloring of the resin. In contrast, in the case in which the amount is insufficient, the resin does not cure. In addition, in a polymerization initiator by using emissions such as visible light, ultraviolet light, etc., a filler having an absorption in the wavelength region of irradiation emission may be used, and in this case, it is necessary that the ratio of the polymerization initiator be increased.

The volumetric shrinkage ratio associated with curing of the hard coat layer employing the above radiation-curing resin (calculated by the following method) is preferably 20% or less. With 20% or more of the volumetric shrinkage ratio, in the case of a film-shaped transparent substrate, the film will curl extremely, and in the case of a rigid substrate such as a glass or the like, the adhesion between the substrate and the hard coat layer is reduced.

Volumetric shrinkage ratio: $D=(S-S')/S \times 100$ wherein S: specific gravity before curing
S': specific gravity after curing (Specific gravity is measured by B method picnometer method of Japanese Industrial Standard K-7112.)

In the hard coat layer according to the present invention, a stabilizer (a thermal polymerization inhibitor) for the radiation curing resin such as hydroquinone, p-benzoquinone, t-butylhydroquinone, etc., may be added. It is preferred that the stabilizer be employed in a range of 0.1 to 5.0% by weight to the radiation-curing resin.

In addition, the refractive index of the hard coat layer can be adjusted by containing a filler having a high refractive index to the binder resin of the hard coat layer. It is preferable that the refractive index of the filler be relatively higher than the refractive index of the resin composite in the hard coat layer and is in a range of 1.6 to 2.7. As a filler, specifically, ZnO (refractive index n=1.9), $TiO_2$ (n=2.3 to 2.7), $CeO_2$ (n=1.95), $Sb_2O_5$ (n=1.71), $SnO_2$ (N=1.95), ITO (n=1.95), $Y_2O_3$ (n=1.87), $La_2O_3$ (n=1.95), $ZrO_2$ (n=2.05), $Al_2O_3$ (n=1.63), $HfO_2$ (n=2.0), $Ta_2O_5$, etc., can be employed. These fillers can be employed alone or in combination, and in a colloidal form dispersed in an organic solvent or in water. In particular, organosol dispersed in organic solvents such as methanol, ethanol, isopropanol, butanone, methyl ethyl ketone, methyl isobutyl ketone, cyclohexane, etc., is more preferable since the dispersibility of the resin used in the hard coat layer is superior. The particle size of the filler is preferably in a range of 1 to 100 nm and is desirably in a range of 5 to 20 nm, in consideration of transparency of the coating film. In addition, the content of the filler to the binder resin is preferably 70% or less. When the content of the filler is increased, the durability of the hard coat layer, such as wear resistance, chemical resistance, etc., is deteriorated. Therefore, it is desirable that the content be decreased as little as possible.

In the present invention, as a method for forming a hard coat layer, directly or via another layer, on one surface or two surfaces of the transparent substrate, a method consisting of the steps of: mixing a filler, water, or an organic solvent in the resin described above, as necessary; dispersing the mixture using a paint shaker, sand mill, peal mill, ball mill, attritor, roll mill, high-speed impeller disperser, jet mill, high-speed impact mill, ultrasonic disperser, etc., to form a coating material or an ink; providing a mono-layer or multi-layers on one surface or two surfaces of the transparent substrate by means of a printing method such as a letterpress printing such as flexographic printing or the like, an intaglio printing such as direct gravure printing, offset gravure printing, or the like, a planographic printing such as offset printing or the like, a stencil printing such as screen process printing or the like, or a coating such as air doctor coating, blade coating, knife coating, reverse coating, transfer roll coating, gravure roll coating, kiss coating, cast coating, spray coating, slot orifice coating, calender coating, electrodeposition coating, dip coating, die coating or the like; thermal-drying the coating or printing layers in the case in which a solvent is included; and curing the coating or printing layers by means of heat or radiation (in the case of UV radiation, a photo-polymerization initiator is necessary), can be employed. In the case in which the radiation is an electron beam, an electron beam having an energy of 50 to 1000 KeV emitted from various electron beam accelerators such as a Cockroft-Walton's apparatus, Van de Graff apparatus, resonance transformer apparatus, insulating core transformer apparatus, linear type apparatus, dynamitron type apparatus, high-frequency type apparatus, or the like is employed. In the case in which the radiation is UV radiation, the UV radiation emitted from the light of an extra-high pressure mercury vapor lamp, high pressure mercury vapor lamp, low pressure mercury vapor lamp, carbon arc lamp, xenon arc lamp, metal halide lamp, or the like can be employed.

In order to improve the coating ability or printing ability of a coating material and an ink, a leveling agent such as silicone oil, etc., fats and oils such as polyethylene wax, carnauba wax, higher alcohol, bisamide, higher fatty acid, etc., a curing agent such as isocyanate, etc., an additive such as ultra-microparticles having a particle size of 0.1 μm or less, such as calcium carbonate, silica sol, synthetic mica, etc., can be employed, as necessary. In addition, in order to prevent contaminants such as dust from adhered electrostatically to displays, an anti-static agent may be added. As the anti-static agent, the materials described in the anti-static layer can be employed.

It the hard coat layer formed as described above, the refractive index is preferably in a range of 1.55 to 1.75. The thickness of the hard coat layer is preferably in a range of 1 to 10 μm, and is more preferably in a range of 1 to 5 μm. In the case in which the thickness of the hard coat layer is less than 1 μm, wear resistance of the hard coat layer is deteriorated, or in the case in which a UV-curing resin is employed in the hard coat layer, the resin fails to cure due to oxidation inhibition. In contrast, in the case in which the thickness of the hard coat layer is more than 10 μm, curling occurs due to curing-shrinkage of the resin, microcracking occurs in the hard coat layer, or the adhesion between the transparent substrate and the hard coat layer is decreased.

②  Second Embodiment

Resins for forming the hard coat layer according to the second embodiment of the present invention, chemical compounds added in order to improve various properties, and forming method of the hard coat layer are almost similar to those of the first embodiment. For this reason, unique components and methods in the second embodiment will be explained in the following.

As a resin for forming the hard coat layer, any resin cured by radiation and/or heat can be employed; however, the resin must contain at least a polymer polymerized urethane (metha)acrylate compound as a polymerizing component. The refractive index and the physical strength of the hard coat layer are thereby improved simultaneously.

The above urethane compounds are shown in the following chemical formulas 6 and 7. The urethane (metha)acrylate compound of chemical formula 6 is a chemical compound having at least two (metha)acrylate groups which is selected from reaction products of (metha)acrylate compound including hydroxyl group and isocyanate compound. The urethane (metha)acrylate compound of chemical formula 7 is a chemical compound having at least two (metha)acrylate groups which is selected from reaction products of (metha) acrylate compound including hydroxyl group, isocyanate compound, and polyol compound. In addition, as a method for obtaining the above urethane (metha)acrylate, any well-known method can be employed.

Chemical Formula 6

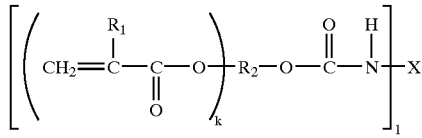

-continued

Chemical Formula 7

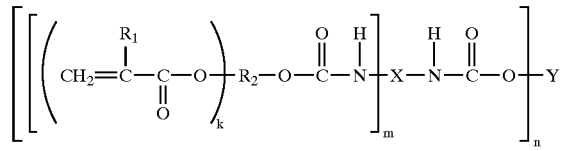

In the chemical formulas, $R_1$ refers to a hydrogen atom or $CH_3$; X refers to a component, excluding isocyanate groups, from an organic isocyanate compound; and $R_2$ and Y refer to polyhydric alcohol groups. k refers to integers of 1 to 5; l refers to integers of 1 to 3; m refers to integers of 1 to 2; and n refers to integers of 1 to 6. k and l cannot both be 1 nor can k, l and m all be 1 at the same time.

As the above (metha)acrylate compound including hydroxyl groups, isocyanate compounds, and polyol compounds, compounds described in the first embodiment can be employed. Furthermore, also with respect to compounds for controlling properties of coating materials or coating films, polymerization initiators, accelerators (sensitizers), and stabilizers (thermal polymerization inhibitors), compounds described in the first embodiment can be employed.

By curing the above composite containing at least an urethane (metha)acrylate compound as a polymerization component, a hard coat layer is formed. In order to cure the resin, for example, radiation such as ultraviolet light, electron beams, and X-rays may be emitted, and a polymerization initiator may be appropriately added as necessary. Specifically, compounds described in the first embodiment can be employed. The content of the polymerization initiator is preferably 0.1 to 10% by weight to overall curing resin components, and is more preferably 3 to 7% by weight.

In addition, in the hard coat layer of the second embodiment, general curing resins can be employed as well as in the first embodiment. The higher the transparency of the curing resin, the better the curing resin. The light transmittance (Japanese Industrial Standard C-6714) is preferably 80% or more as well as for the transparent substrate, and is more preferably 90% or more. Since the transparency of the anti-reflection material is affected by the refractive index of the cured resin, the refractive index is preferably in a range of 1.55 to 1.70, and is more preferably in a range of 1.60 to 1.70. If it deviates from this range, the anti-reflective effect is decreased.

Furthermore, in order to increase the refractive index of the above resin, resins containing an aromatic ring or a halogen element such as Br, I, or Cl, may be selected. As a resin containing an aromatic ring, styrenes such as polystyrene, PET, polycarbonate of bisphenol A, etc., can be employed. As a resin containing a halogen element, polyvinylchloride, polytetrabromobisphenol A glycidylether, etc., can be employed. In addition, resins containing S, N, P, etc., also have a high refractive index, and specifically, polyvinylpyridine, polybisphenol S glycidylether, etc., can be employed.

In the second embodiment, by polymerizing the above urethane (metha)acrylate compound as an essential component, superior dispersibility is exhibited in the case in which ultrafine particles having a high refractive index are added to binder resin of the hard coat layer. The refractive index of the hard coat layer can thereby be easily adjusted and an anti-reflective effect can be further improved. As an ultrafine particle compound having a high refractive index in the second embodiment, compounds described in the first embodiment can be employed. It is preferable that these ultrafine particles be employed alone or in combination as a sol having a particle size of 30 nm or less.

The ultrafine particles can be prepared as a sol by well-known methods. For example, $TiO_2$ powder is suspended in a dispersing solution of water or an organic solvent so that the concentration is 1 to 40% by weight. Next, the suspension is adjusted to a pH value in a range of 1 to 7 by adding acid and is contacted with a cation exchanger. Alternatively, it is adjusted to a pH value in a range of 7 to 14 by adding alkali and is contacted with an anion exchanger. A colloidal solution of $TiO_2$ can thereby be prepared. The contact with the ion exchanger is carried out until the suspension of titania powder turns into a sol state, and a titania sol dispersed uniformly is prepared by treating the $TiO_2$ fine particle at a room temperature to 200° C. for 0.5 to 200 hours.

As an organic solvent serving as a dispersing solution, solvents such as alcohol, glycol, ester, aromatic type, etc., can be employed. Specifically, methanol, ethanol, propanol, ethylene glycol, glycerol, acetone, methyl ethyl ketone, methyl cellosolve, ethyl cellosolve, dimethylformamide, N-Methyl-2-pyrrolidone, etc., can be employed. In addition, the surface of the titanium oxide particle is treated with a silane coupling agent, a titanate coupling agent, a surfactant, a higher fatty acid or salt thereof, etc., and a low polarity organic solvent such as xylene, toluene, etc., can also be employed as a dispersion agent for the titania sol.

As an acid added for adjusting the pH value, monobasic acids such as hydrochloric acid, nitric acid, acetic acid, chloric acid, chloroacetic acid, etc., dibasic acids such as sulfuric acid, etc., and tribasic acids such as phosphoric acid, etc., can be employed. These acids can be employed alone or in combination. As an alkali, hydroxide of alkali metal elements such as sodium hydroxide, potassium hydroxide, lithium hydroxide, etc., and nitrogen compounds such as ammonia, tetramethylammonium hydroxide, etc., can be employed. These alkalis can be employed alone or in combination.

In the production of the titania sol, the addition amount of the acids or the alkalis is preferably $5 \times 10^{-4}$ to 0.05 equivalent to 1 equivalent of the titanium (Ti), and is more preferably $2.5 \times 10^{-3}$ to 0.025 equivalent.

As an ion exchanger, any materials having an ion exchange capacity can be employed. As a cation exchanger, strongly acidic or weakly acidic cation-exchange resin, chelating resin, ion exchange membrane, zeolite, etc., can be employed. As an anion exchanger, strongly basic or weakly basic anion exchange resin, chelating resin, ion exchange membrane, etc., can be employed. These ion exchangers can be employed alone or in combination. In the case in which ion-exchange resin or zeolite is employed as an ion exchanger, the amount of the ion exchanger used is preferably 1 to 10 liters to 1 kg of $TiO_2$.

The titania sol obtained by the above method may be concentrated by vacuum distillation, ultrafiltration, etc., and then water or organic solvent may be added thereto. A titania sol suspension having the required composition can thereby be prepared. In the sol suspension of the ultrafine particle filler according to the present invention, an organic solvent is preferably employed. The particle size thereof is preferably 30 nm or less, and is more preferably 20 nm or less in consideration of the transparency of the coating film.

③ Third Embodiment

Resins for forming the hard coat layer according to the third embodiment of the present invention, chemical compounds added for improvement of various properties, and forming methods of the hard coat layer are very similar to those of the first embodiment. For this reason, unique components and methods in the third embodiment will be explained below.

As a resin for forming the hard coat layer of the third embodiment, resins described in the first embodiment can be employed. Of these resins, in particular, urethane (metha) acrylates shown in the following chemical formulas 6 and 7 in the second embodiment, are preferable since adhesion with a base material, wear resistance, and chemical resistance are superior.

Chemical Formula 6

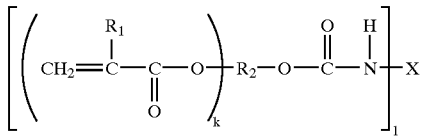

Chemical Formula 7

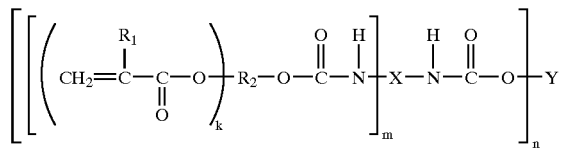

In the chemical formulas, $R_1$ refers to hydrogen atom or $CH_3$; X refers to isocyanate group; and $R_2$ and Y refer to polyhydric alcohol group. k refers to integers of 1 to 5; l refers to integers of 1 to 3; m refers to integers of 1 to 2; and n refers to integers of 1 to 6. k and l cannot both be 1, nor can k, l and m all be 1 at the same time.

In addition, a hard coat layer according to this embodiment must contain ultrafine particles of titanium oxide in the above curing resin. The ultrafine particles of titanium oxide are surface-treated by oxide or hydroxide of at least one element chosen from silicon, zirconium, aluminum, tin, and cesium. The hard coat layer can thereby be adjusted to have a high refractive index.

The process for producing the ultrafine particle of titanium oxide used in the third embodiment basically consists of a process for forming ultrafine particles of titanium oxide and a process for surface-treating of the titanium oxide ultrafine particles by oxide or hydroxide of at least one element chosen from silicon, zirconium, aluminum, tin, and cesium. As the production technique, for example, a wet chemical method or a gas phase method can be employed; however, production techniques employed in the present invention are not limited thereto.

As a production technique by a wet chemical method, well-known production techniques for titania sol described in the second embodiment can be employed. A specific example thereof is shown in the following.

Firstly, water-containing titanic acid gel or sol is prepared. For example, the water-containing titanic acid gel is produced by adding alkali to an aqueous solution of titanium salt such as titanium chloride, sulfuric acid titanium, etc., so as to neutralize it. Alternatively, the water-containing titanic acid sol is obtained by passing the aqueous solution of the titanium salt through ion-exchange resin so as to remove the anion. The method for producing these sols or gels is not limited to the above methods and well-known methods can be employed. Here, the water-containing titanic acid described above refers to a hydrate of titanium oxide or titanium hydroxide.

Secondly, hydrogen peroxide is added to the prepared water-containing titanic acid gel, the water-containing titanic acid sol, or these mixtures, and the aqueous solution of water-containing titanic acid is thereby produced. At this time, it is preferable that heating or stirring be carried out as necessary. The $TiO_2$ content is preferably about 10% by weight or less, and is more preferably about 5% by weight or less. When the content exceeds 10% by weight, time is required to dissolve the water-containing titanic acid, and gel in an undissolved state is thereby precipitated or the viscosity of the aqueous solution is increased thereby. The amount of the hydrogen peroxide added is preferably in a range of 1 to 6 by $H_2O_2/TiO_2$ weight ratio and is more preferably in a range 2 to 5 by $H_2O_2/TiO_2$ weight ratio. When the $H_2O_2/TiO_2$ weight ratio is below 1, the water-containing titanic acid does not completely dissolve and undissolved gel or sol remains thereby. In contrast, when it exceeds 6, large amounts of unreacted hydrogen peroxide remains in the system. Since these residues affect subsequent processes, it is not desirable that the ratio deviate from the above range. The reaction temperature is preferably 50° C. or more, and is more preferably 70° C. or more.

Next, inorganic compounds in suitable amounts are added to the aqueous solution in which is dissolved the above water-containing titanic acid (titanic acid aqueous solution), and is heated to 60° C. or more and preferably to 80° C. or more, and titanic acid is thereby hydrolyzed. Thus, titania sol in which the titania particles are uniformly dispersed is obtained.

As the above inorganic compounds, oxides, hydroxides, oxyacids, or oxyacid salts of one or more kinds of elements chosen from group III such as Al, etc., group IV such as Ti, Zr, Si, Sn, etc., group V such as V, Sb, etc., group VI such as W, etc., group VII such Fe, etc., in the periodic table of elements, can preferably be employed, and of these, in particular, titania sol can be preferably employed. These inorganic compounds may be added as a solid, or as an aqueous solution. As a most suitable method, it is preferable that gels or sols of these inorganic compounds be employed. In the case in which the sol is employed, the average particle size of dispersed particles is preferably 25 nm or less and is more preferably 10 nm or less.

With an increase in the amount of the inorganic compound added, long-term stability and light resistance of the titania sol increase, and a high-concentration sol can be obtained. However, when the amount added exceeds some definite amount, these effects are not obtained, and on the contrary, the effect of the titania sol deteriorates. When the addition amount is too small, problems occur in that the particle size of the titania sol is not made uniform, and the particles aggregate, or the like. The addition amount of the inorganic compound to be mixed is preferably in a range of 0.01 to 0.40 by $MO_x/TiO_2$ ratio (weight ratio) of the value in which inorganic compound weight is converted into oxide ($MO_x$) to value in which titanium weight in titanic acid aqueous solution is converted into $TiO_2$. With respect to the mixing of the inorganic compound and the titanic acid aqueous solution, both may be mixed all at once, or after a small amount is mixed in, the remainder may be added a little at a time depending on the progress of the reaction. The mixing method is not particularly limited. The time for mixing the inorganic compound is not particularly limited so long as the titanic acid aqueous solution is not heated and hydrolyzed. When the inorganic compound is not mixed, the titania sol to be obtained is extremely unstable. The sol is broken and precipitated in the case in which it is concentrated. With respect to the titania sol obtained in this way, total solid concentration is preferably 7% by weight or less. When it exceeds 7% by weight, titania particles easily aggregate.

Next, surface-treated titanium oxide ultrafine particles according to the present invention can be formed by adding one or more compound chosen from silicon compounds, zirconia compounds, aluminum compounds, tin compounds, and cesium compounds to the above titania sol. An example is described in the following.

In the case in which a silicon compound is added to the titania sol, a silicic acid solution in which silicic acid alkali aqueous solution is dealkalinized by a cation-exchange resin, silica sol in which silicic acid alkali is neutralized by acid, solution or dispersion of alkoxide of silicon compound such as ethyl silicate, etc., or hydrolyzate of silicon compound, and the like, can be employed. The particle size of the silica is preferably 25 nm or less. The method for adding the solution or dispersion of silicon compound to the titania sol is chosen depending to the solid concentration of each solution or dispersion. In the case in which both solid concentrations are dilute, there is no problem even if a method is used in which these are mixed all at once. In the case in which the titania sol is dense, it is preferable that the solution or dispersion of silicon compound be gradually added despite the concentration. Solution temperature in the case of mixing or addition is preferably 60° C. or more. If an alkoxide such as ethyl silicate is employed, in order to prevent generation of colloidal particle of silica, it is preferable that it be gradually added at a relatively low temperature of 40° C. or less, and that it is heated to a temperature over 60° C. after being added, and the reaction is thereby completed. The pH value of the mixture solution is preferably in a range of 6 to 10.

The silicon compound reacted in this way is adhered to a titania particle surface of the titania sol, as an oxide or hydroxide of silicon. Alternatively, the titania particle surface is modified by reacting these oxides or hydroxides with the titania particle.

With respect to zirconia compounds, aluminum compounds, tin compounds, and cesium compounds, too, each oxide or hydroxide may be adhered to the titania particle surface of the titania sol by mixing and reacting with the titania sol using the solution or dispersion of zirconium salt, ammonium salt, etc., in the same manner as the above silicon compound, or the titania particle surface is modified, and then the surface-treated titanium oxide ultrafine particles according to the present invention can be obtained by concentrating, as described below, as necessary.

In the case in which aqueous solutions or dispersions of these five compounds are added to the titania sol, two or more kinds may be employed in combination. In addition, the processing is repeatedly carried out, and multi-membrane may be formed. In the case, the combination is not limited.

With respect to the amount of these added components adhered to the surface as oxide and/or hydroxide or treated amount, weight ratio of the treated amount converted as a total amount of oxide ($MO_x$) to the $TiO_2$ amount of the titania sol is preferably in a range of 0.1 to 0.5. When the ratio is below 0.1, photocatalytic effects cannot be prevented, and light resistance is thereby deteriorated. In contrast, when it exceeds 0.5, the refractive index of the treated titanium oxide ultrafine particle is not sufficiently obtained, and the hard coat layer thereby does not have a high refractive index. In addition, if the addition amount of the titanium oxide ultrafine particle increases in order to ameliorate the above problem, wear resistance on the surface of an anti-reflection material is deteriorated, and compatibility of the high refractive index and the wear resistance is difficult thereby.

The titania sol on which the surface treatment was carried out in this way is stable in a wide range of pH values. In addition, the solid concentration can also be concentrated to about 30%. As a concentration method, well-known methods such as evaporation, ultrafiltration, etc., can be employed. The titania sol is also stable in the case in which the dispersion medium is replaced with an organic solvent. The particle size of the final titanium oxide ultrafine particle is preferably 30 nm or less, and is more preferably 15 nm or less. When it exceeds 30 nm, transparency of the hard coat layer is deteriorated.

As a method for forming the titanium oxide ultrafine particle using a gas phase method, a vapor deposition technique is applied. Specifically, the bulk of the titanium metal is put in a vacuum chamber, and pressure is decreased to $10^{-4}$ Pa or less. Then, titanium atoms are evaporated from the bulk surface by heating the titanium metal, and subsequently this is reacted with oxygen. Titanium oxides molecules obtained by the reaction are introduced into inert gas such as helium, so as to cool and solidify. Thus, titanium oxide ultrafine particle having a particle size of 30 nm or less is formed. As a surface-treatment for this titanium oxide, the titanium oxide is prepared as a colloidal solution, and then the same method as the above-described wet chemical method is carried out.

The crystal structure of the titanium oxide may be classified into three types: the brookite-type, the anatase-type, and the rutile-type. Of these types, as a crystal structure of titanium oxide ultrafine particles according to the present invention, the rutile-type is preferable since photocatalytic effects are small. As a high-purity rutile-type titanium oxide sol, for example, titanium oxide sol produced by a method described in Japanese Unexamined Patent Application Publication No. 62-235215, can be employed.

The refractive index of the hard coat layer is preferably in a range of 1.55 to 1.70, and is more preferably in a range of 1.60 to 1.70. In order to adjust to such a refractive index, the refractive index of the titanium oxide ultrafine particle is preferably 1.95 or more, and is more preferably 2.05 or more. When it is below 1.95, a large amount of the titanium oxide ultrafine particles must be contained in the hard coat layer, and durability such as wear resistance and light resistance of the hard coat layer is thereby lowered. The content of the titanium oxide ultrafine particle is preferably in a range of 20 to 60% and is more preferably in a range of 20 to 45% by total solid concentration in the hard coat layer. When it is 20% or less, the refractive index of the hard coat layer is not sufficient. In contrast, when it exceeds 60%, the durability of the hard coat layer is lowered as described above.

C. Anti-reflection Film

In order to obtain the anti-reflection function, an anti-reflection film consisting of one layer or multiple layer adjusted refractive index on a hard coat layer is provided. First, an anti-reflection film consisting of one layer will be explained in detail.

In the case of a one layer constitution, the composition of the anti-reflection film is not limited; however, in particular, it is preferable that the criticality surface tension be 20 dyne/cm or less. In the case in which the critical surface tension is more than 20 dyne/cm, it is difficult for contaminants adhering to the anti-reflection film to be wiped off. In addition, in order to improve anti-reflection effects, the refractive index of the anti-reflection film is preferably 1.20 to 1.45. As a material having such characteristics, specifically, an inorganic low-reflection material wherein an inorganic material such as LiF (refractive index: n=1.4), $MgF_2$ (n=1.4), 3NaF. $AlF_3$(n=1.4), $AlF_3$(n=1.4), $Na_3AlF_6$ (n=1.33), $SiO_2$(n=1.45), or the like is microgranulated and is contained in an acrylic resin or an epoxy resin, or an organic low-reflection material such as a fluorine type or silicone type organic compound, a thermoplastic resin, a thermosetting resin, a radiation-curing resin, or the like, can be employed. In the case in which a transparent substrate is a plastic film which is liable to be damaged by heat, such as TAC, PET, etc., a radiation-curing resin is preferably employed as a material for the anti-reflection film. Of these, a fluorine-containing type fluorine material is particularly preferred in view of contamination-preventing effects.

As the fluorine-containing material described above, a fluorinated vinylidene type copolymer which can be dissolved in an organic solvent and is easy for treating, a fluoro-olefin/hydrocarbon olefin copolymer, a fluorine-containing epoxy resin, a fluorine-containing epoxy acrylate, a fluorine-containing silicone, a fluorine-containing alkoxysilane, as well as, TEFLON AF 1600 (produced by DuPont Inc., n=1.30), CYTOP (produced by Asahi Glass Co., Ltd., n=1.34), 17 FM (produced by Mitsubishi Rayon Co., Ltd., n=1.35), Opster JN-7212 (produced by Japan Synthetic Rubber Co., Ltd., n=1.40), LR 201 (produced by Nissan Chemical Industries, Ltd., n=1.38), or the like, can be employed. These may be employed alone or in combination.

In addition, a radiation-curing-type fluorine-containing monomer, oligomer, prepolymer, or the like such as a fluorine-containing methacrylate such as 2-(perfluorodecyl) ethyl methacrylate, 2-(perfluoro-7-methyloctyl)ethyl methacrylate, 3-(perfluoro-7-methyloctyl)-2-hydroxypropyl methacrylate, 2-(perfluoro-9-methyldecyl)ethyl methacrylate, 3-(perfluoro-8-methyldecyl)-2-hydroxypropyl methacrylate, or the like, a fluorine-containing acrylate such as 3-perfluorooctyl-2-hydroxypropyl acrylate, 2-(perfluorodecyl)ethyl acrylate, 2-(perfluoro-9-methyldecyl)ethyl acrylate, or the like, an epoxide such as 3-perfluorodecyl-1,2-epoxy propane, 3-(perfluoro-9-methyldecyl)-1,2-epoxy propane, or the like, an epoxy acrylate, or the like can be employed. These can be employed alone or in combination.

However, although these are superior in contamination resistance, they may have disadvantages in that the anti-reflection film is repelled at the hard coat layer in the case of some composition ratios, or the anti-reflection film may be peeled off from the hard coat layer due to bad wettability. For these reasons, it is desirable that monomers, oligomers, or prepolymers having a polymeric unsaturated bonding such as an acryloyl group, methacryloyl group, acryloyloxy group, methacryloyloxy group, etc., be employed by appropriately mixing, as a radiation-curing-type resin.

Furthermore, a low-reflection material obtained by mixing a fluorine-type film-forming agent and a sol wherein silica microparticles having a particle size of 5 to 30 nm are dispersed in water or an organic solvent can be employed. As the sol wherein silica microparticles having a particle size of 5 to 30 nm are dispersed in water or an organic solvent, a well-known silica sol obtained by means of condensation of an activated silicic acid known by a method for de-alkalization using an ion exchange of an alkali metal ion in an alkaline salt of silicic acid, or a method for neutralization of an alkaline salt of silicic acid with a mineral acid; a well-known silica sol obtained by means of hydrolysis and condensation of an alkoxysilane in an organic solvent in the presence of a basic catalyst; or an organic-solvent type silica sol (organosilica sol) obtained by replacing the water in an aqueous silica sol described above with an organic solvent by a distillation method may be employed. These silica sols can be employed in either an aqueous or organic-solvent condition. The organic-solvent type silica sol contains a solid component as $SiO_2$ in a concentration of 0.5 to 50% by weight. Various types of silica ultra-microparticles in the silica sol such as in a spheroidal form, a needle form, a plate form, or the like can be employed.

As a film forming agent, an alkoxysilane, a metal alkoxide, a hydrolysate of metal salt, fluorine-modified polysiloxane, or the like can be employed. The critical surface tension of the anti-reflection film is lowered by using the above described film forming agent, whereby adhesion of oil thereto can be suppressed.

In addition, in order to prevent contaminants such as dust from electrostatically adhering on a display surface, an anti-static agent may be added into the anti-reflection film, or an anti-static layer may be provided on a surface of the anti-reflection film. The thickness of the above anti-static layer is desirably the thickness of an optical film which does not affect the anti-reflection effect, and is more desirably 10 nm or less. As an anti-static agent, materials explained in the above-described anti-static layer can be employed.

The above described low-reflection material is provided on the hard coat layer by wet-coating methods such as roll coating, printing, etc., or by gas phase methods such as vacuum evaporating, sputtering, plasma CVD, ion plating, etc., whereby an anti-reflection film consisting of one layer according to the present invention can be formed. In the case in which it is provided by a wet-coating method, in order to improve the coating aptitude or printing aptitude, a leveling agent such as silicone oil, etc., fats and oils such as polyethylene wax, carnauba wax, higher alcohol, bisamide, higher fatty acid, etc., a curing agent such as isocyanate, etc., an additive such as ultra-microparticles having a particle size of 0.05 μm or less, such as calcium carbonate, silica sol, synthetic mica, etc., can be employed, as necessary.

The thickness of the anti-reflection film for serving a superior anti-reflection effect can be calculated according to a well-known expression. According to the well-known document (Science Library, Physics 9 "Optics", pp. 70 to 72), when incident light is vertically incident to the anti-reflection film, it is deemed that the conditions for which the anti-reflection film does not reflect the light and 100% of the light is transmitted may be satisfied by the following relational expression. In the expression, $N_0$ represents a refractive index of the anti-reflection film, $N_S$ represents a refractive index of the hard coat layer, h represents a thickness of the anti-reflection film, and $\lambda_0$ represents a wavelength of the light.

$N_0=N_S^{1/2}$ Expression (1)

$N_0 h=\lambda_0/4$ Expression (2)

According to Expression (1), it can be seen that in order to prevent the light reflection completely (100%), a material wherein the refractive index of the anti-reflection film corresponds to the square root of the refractive index of the lower layer (hard coat layer) may be selected. In fact, it is difficult to find a material that satisfies the expression completely, and therefore, a material which has properties very near to those of a material that completely satisfies the expression is used. In expression (2), the optimum thickness of the anti-reflection film can be calculated from the refractive index of the anti-reflection film selected according to expression (1) and the wavelength of the light. For example, in the case where the refractive index of the hard coat layer and that of the anti-reflection film are 1.50 and 1.38, respectively, and the wavelength of the light is 550 nm, an optical film thickness of the anti-reflection film is calculated as approximately 0.1 μm, and preferably in a range of 0.10±0.01 μm, according to expression (2). Thus, the anti-reflection film must be very thinly and very uniformly provided (the in-plane dispersion of the thickness causes the color nonuniformity by the interference with the hard coat layer). Therefore, a gas phase method is desirable as a method for forming an anti-reflection film.

Subsequently, an anti-reflection layer consisting of two or more layers will be explained. In the case in which an anti-reflection layer consists of two or more layers, one set of or some sets of laminated compositions in which a low refractive layer is laminated on a high refractive layer, or one set of or some sets of laminated compositions in which a high refractive layer is laminated on a low refractive layer and then another low refractive layer is laminated thereon, is provided on a hard coat layer. In this case, the refractive index n of the high refractive layer is preferably higher than that of the hard coat layer and is preferably in the range of 1.65 to 2.70. The refractive index of the low refractive layer as the surfacemost layer is preferably in the range of 1.20 to 1.45. In addition, the refractive index of the low refractive layer provided below the high refractive layer (hard coat layer) is preferably lower than that of the hard coat layer and is preferably higher than that of the low refractive layer provided thereon, and it is preferably in the range of 1.35 to 1.55.

In the high refractive layer, the materials described in the above high refractive ultrafine particles can be employed. The high refractive layer may be directly provided on the hard coat layer or the low refractive layer by gas phase methods such as vapor deposition, CVD, or sputtering. Alternatively, a coating material or an ink is prepared by mixing the high refractive ultrafine particle prepared as a sol having a particle size of 30 nm or less with resin, solvents, etc.; it is coated on the hard coat layer or the low refractive index layer by spin coaters, roll coaters, printing, etc.; and then after drying, it is curred by heat or radiation (in the case in which ultraviolet light is irradiated, the above photopolymerization initiator is employed), etc.; whereby the high refractive layer may also be provided. The thickness of the high refractive layer is preferably adjusted to be in the range of 0.05 to 0.15 μm.

As a resin in the high refractive layer, transparent resin can be optionally employed, and thermosetting resin, thermoplastic resin, radiation (containing ultraviolet-light)-curing resin, etc., can be employed. As a thermosetting resin, phenol resin, melamine resin, polyurethane resin, urea resin, diallyl phthalate resin, guanamine resin, unsaturated polyester resin, amino alkyd resin, melamine-urea cocondensated resin, silicon resin, polysiloxane resin, etc., can be employed. In addition, inorganic type binder such as silicate type oligomer obtained by hydrolysis and condensation of alkoxysilane, etc., for example, MKC silicate MS51 produced by Mitsubishi Chemical Co., Ltd., can be also employed. In these resins, crosslinking agents, catalysts, hardeners such as polymerization initiators, polymerization promotors, solvents, viscosity modifiers, anti-static agents, etc., can be added as necessary.

As a radiation-curing-type resin, polyester resin, polyether resin, acrylic resin, epoxy resin, alkyd resin, polybutadiene resin, spiroacetal resin, urethane resin, oligomer or preoligomer of (metha)acrylate of multifunctional compounds such as polyhydric alcohol, and as a reactive diluent, monofunctional monomer or multifunctional monomer such as ethyl(metha)acrylate, ethylhexyl(metha)acrylate, styrene, methylstyrene, N-vinylpyrrolidone, etc., can be employed.

In the case in which the above resin is employed as a UV-curing resin, as a photopolymerization initiator, acetophenones, benzophenones, α-amyloxym ester, Michler's benzoyl benzoate, tetramethyl thiuram monosulfide, thioxanthones, as a photosensitizer, n-butylamine, triethylamine, etc., can be employed by adding.

In the low refractive layer provided below the surfacemost layer or the highly refractive layer, the materials explained in the above anti-reflection film consisting of one layer can be employed. In an interface between the hard coat layer and the anti-reflection film (containing interfaces between each layer when the anti-reflection film consists of two layers or more), in order to improve adhesive strength, coating ability, etc., an adhesive layer may be provided and various surface-treatments explained in the above transparent substance may be carried out. The thickness of the adhesive layer is preferably 30 nm or less. Although materials of the adhesive layer are not particularly limited, it is desirable that the above inorganic type binder resin be used since the light resistance is improved.

(2) Polarization Film

In an anti-reflection material having the composition described above, a polarization substrate is provided on a surface which does not provide a hard coat layer and an anti-reflection film, and a protecting material is further provided on the polarization substrate, whereby a polarization film is formed. In the following, a polarization film according to the present invention will be explained in detail.

A. Polarization Substrate

The polarization substrate consists of a material which can form a transparent film, and as the material, for example, polyvinyl alcohol (PVA), polyvinylene, etc., can be employed. Such a material is drawn to form a film, thus yielding a polarization substrate. Specifically, iodine or a dye is adsorbed in a PVA as a dichroic element, and then a film which is uniaxially drawn from this PVA can be preferably employed. A polarization substrate having a thickness of 10 to 80 μm may be employed. More specifically, a PVA film is drawn approximately three or four times in a uniaxial direction, and. subsequently the drawn PVA film is immersed into a high-order iodine ion, whereby a polarization substrate can be formed.

B. Protecting Material

Since the polarization substrate obtained above has disadvantages in that it is liable to tear and the shrinking ratio is large due to humidity changes, due to impaired strength, a protecting material is laminated on one surface of the polarization substrate. Also the transparent substrate of the anti-reflection material is laminated on another surface of the polarization substrate so as to function similarly as the protecting material. The protecting material and the transparent substrate are adhered to the surface of the polarization substrate using a polyester type adhesive, a polyacrylic type adhesive, a polyurethane type adhesive, a polyvinyl acetate type adhesive, or the like.

As the protecting material, a film of a transparent polymer compound such as a cellulose type film such as triacetyl cellulose, a polyester film, a polycarbonate film, or the like is employed. Triacetyl cellulose is in particular preferred thereamong. The film thickness is preferably in a range of 10 to 2000 μm. In addition, it is preferred to improve the water resistance of the film by means of employing a gelling agent such as boric acid or the like, by a heat treatment, or by a formalization. In addition, in order to improve the adhesion between the polarization substrate and the film, it is preferred that a surface-treatment such as a saponification treatment, a corona treatment, or the like be carried out so that the surface energy of the adhesion face with the polarization substrate is 50 dyne/cm or more.

BEST MODE FOR CARRYING OUT THE INVENTION

An anti-reflection material and a polarization film according to the present invention will be explained in detail referring to the following drawings.

Figure 1:
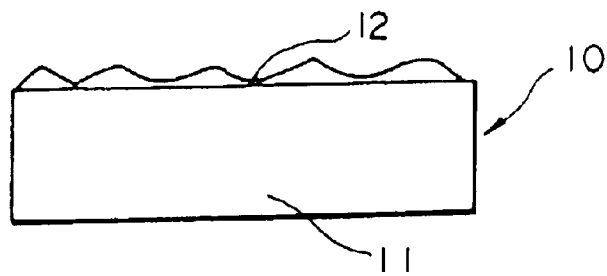
FIG. 1 is a schematic cross-sectional drawing showing a structure of an anti-reflection material according to the present invention.

FIG. 1 shows a schematic cross section of an anti-reflection material. The anti-reflection material 10 consists of a transparent substrate 11 and a hard coat layer 12 formed on a surface thereof. An anti-reflection film is formed on a surface of the hard coat layer 12. The anti-reflection film is not shown since the film is very thin (similarly hereinafter).

Figure 2:
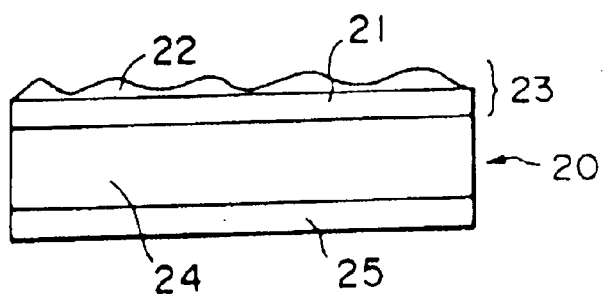
FIG. 2 is a schematic cross-sectional drawing showing a structure of a polarization film employing an anti-reflection material according to the present invention.

FIG. 2 shows a schematic cross section of a polarization film 20 according to the present invention. In the polarization film 20, an anti-reflection material 23 consists of a transparent substrate 21 and a hard coat layer 22 is laminated on a surface of a polarization substrate 24. A protection film 25 is laminated on another surface of the polarization substrate 24.

Figure 3:
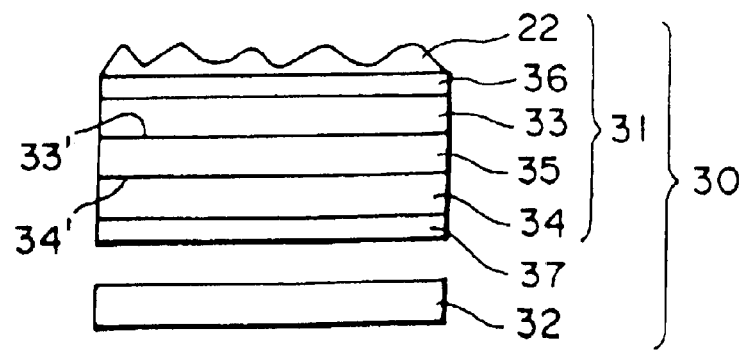
FIG. 3 is a schematic cross-sectional drawing showing a structure of a liquid display equipped with a polarization film employing an anti-reflection material.

FIG. 3 shows a liquid crystal display 30 having improved anti-reflection properties due to an anti-reflection material according to the present invention. The liquid crystal display 30 is manufactured by laminating a liquid crystal panel 31 on a back light 32 including a light guide plate (EL), a lamp, and the like. A twisted nematic (TN) liquid crystal cell can be used in the liquid crystal panel 31.

In the TN liquid crystal cell, alignment layers are formed by coating a epoxy resin on transparent electrodes 33' and 34' of a pair of glass substrates 33 and 34. The alignment layers are aligned by rubbing treatment. Then, a nematic liquid crystal 35 is filled between the glass substrates 33 and 34 and is sealed therein by adhering the periphery of the glass substrates 33 and 34 with a resin. The nematic liquid crystal 35 is aligned with a twist angle of 90 degrees by virtue of the alignment layer. A polarization film 37 without a surface-roughened layer is adhered to the back light side of the glass substrates 33 and 34. A polarization film 36 consisting of the protection film 25, the anti-reflection material 23 and the polarization film 24 held therebetween is adhered to the opposite side of the glass substrates 33 and 34. The polarization films 36 and 37 are disposed so as to twist the polarization angles thereof with 90 degrees, whereby the liquid crystal panel 31 is formed.

When a driving signal is applied to the transparent electrodes of the TN liquid crystal panel 31, an electric field is produced between the electrodes. Then, the long axis of the molecules of the liquid crystal becomes parallel to the direction of the electric field by virtue of electric anisotropy of the molecules of the liquid crystal. As a result, since the optical rotatory power by the molecules of the liquid crystal is disappeared, light is not transmitted through the liquid crystal panel. The contrast due to differences in the light transmittance is then visible. In the liquid crystal display 30, contrast is between the portions where the light is transmitted and is not transmitted to form images.

Figure 4:
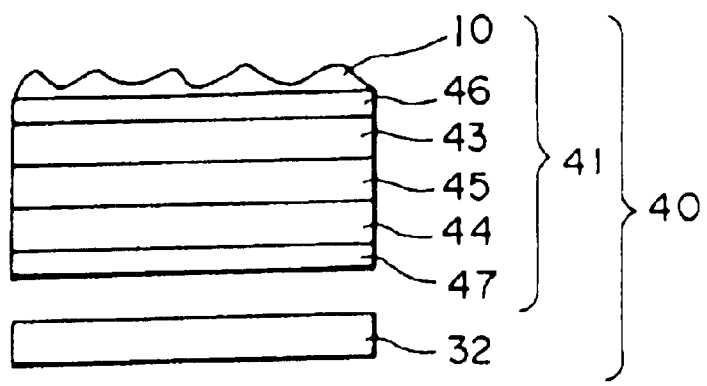
FIG. 4 is a schematic cross-sectional drawing showing a structure of another liquid display equipped with a polarization film employing an anti-reflection material.

FIG. 4 shows a cross section of another liquid crystal display using the anti-reflection material 10. The liquid crystal panel 41 consists of a pair of glass substrates 43 and 44; a nematic liquid crystal 45 held therebetween; an upper polarization film 46 which is adhered to the glass substrates 43 and 44 and has no surface-roughened layer; a lower polarization film 47 which has no surface-roughened layer; and an anti-reflection material 10 which is laminated on the polarization film 46. The liquid crystal display 40 is formed by disposing the liquid crystal panel 41 above a back light 32.

EXAMPLES

In the following, the present invention will be explained in detail by the Examples. Here, "parts" refers to "parts by weight".

① First Embodiment

<Synthesis of A Component>

Synthesis Example A-1

600 g of bisphenoxyethanol fluorene (trade name: BPEF; produced by Osaka Gas Chemical Co., Ltd.), 258 g of acrylic acid, 30 g of p-toluenesulfonic acid, 1350 g of toluene, 1 g of hydroquinone monomethylether, and 0.03 g of hydroquinone were mixed, and the dehydration esterification reaction was carried out on the mixture under refluxing at 100 to 115° C., until the theoretical anhydrous amount is obtained. Then, the reacted solution was neutralized by alkali, and was washed with a 10% salt solution. After washing, toluene was removed, and diacrylate (A-1) was obtained.

Synthesis Example A-2

350 g of bishydroxyphenyl fluorene, 500 g of epichlorohydrin, and 10 g of triethyl benzylammonium chloride were mixed, 160 g of 50% sodium hydroxide aqueous solution was dropped therein under refluxing, and the mixture was reacted for about 3 hours while distilled water was removed outside the system. Then, 300 g of water was added, and after standing, an organic layer was fractionated. The organic layer was adjusted to a pH value of 5 by acetic acid, and was washed two times by 300 g of water. Then, the remaining water and epichlorohydrin were removed by concentration. This product was an epoxy equivalent of 270. 80 g of toluene, 0.5 g of hydroquinone monomethyl ether, and 95 g of acrylic acid were added thereto, and this was heated to 100° C. and was reacted for about 15 hours. Diacrylate (A-2) solution having a resin acid value of 5 mg KOH/g, an epoxy equivalent of 7500, and a solid content of 85%, was thereby obtained.

<Synthesis of B Component>

Synthesis Example B-1

940 g of mixture of pentaerythritol triacrylate and pentaerythritol tetraacrylate (hydroxyl group value of 120 mg KOH/g, hereinafter referred to as PETA), 168 g of hexamethylene diisocyanate (hereinafter referred to as HDI), and several drops of dibutyl tin dilaurate (hereinafter referred to as DBTL) were mixed, and this was heated to 80° C. and was reacted for about 5 hours. Urethane acrylate (B-1) was thereby obtained.

Synthesis Example B-2

200 g of mixture of dipentaerythritol pentaacrylate and dipentaerythritol hexaacrylate (hydroxyl group value of 53 mg KOH/g, hereinafter referred to as DPPA), 168 g of HDI, and several drops of DBTL were mixed, and this was heated to 80° C. and was reacted for about 7 hours. Urethane acrylate (B-2) was thereby obtained.

Synthesis Example B-3

Synthesis was carried out in the same manner as in Synthesis example B-1, except that 174 g of 2,4-tolylene diisocyanate was employed instead of 168 g of HDI, and urethane acrylate (B-3) was thereby obtained.

Synthesis Example B-4

Synthesis was carried out in the same manner as in Synthesis example B-1, except that 250 g of 4,4'-diphenylmethane diisocyanate (hereinafter referred to as MDI) was employed instead of 168 g of HDI, and urethane acrylate (B-4) was thereby obtained.

Synthesis Example B-5

Synthesis was carried out in the same manner as in Synthesis example B-1, except that 188 g of xylylene diisocyanate was employed instead of 168 g of HDI, and urethane acrylate (B-5) was thereby obtained.

Synthesis Example B-6

3200 g of DPPA, 666 g of nulate compound of isophorone diisocyanate, and several drops of DBTL were mixed, and this was heated to 80° C. and was reacted for about 7 hours. Urethane acrylate (B-6) was thereby obtained.

Synthesis Example B-7

438 g of bisphenoxyethanol fluorene, 500 g of MDI, and several drops of DBTL were mixed, and this was heated to 80° C. and was reacted for about 3 hours. Next, 2350 g of DPPA was added thereto, and this was further reacted at 80° C. for about 6 hours. Urethane acrylate (B-7) was thereby obtained.

Synthesis Example B-8

134 g of dimethylol propionic acid, 500 g of MDI, and several drops of DBTL were mixed, and this was heated to 80° C. and was reacted for about 6 hours. Next, 1050 g of PETA was added thereto, and this was further reacted at 80° C. for about 6 hours. Urethane acrylate (B-8) was thereby obtained.

Example 1

At first, a dispersing solution obtained by dispersing a mixture consisting of the composition below for 30 minutes using a sand mill, and a base coating material consisting of the composition below were stirred for 15 minutes using a disper. The mixed coating material was coated on one surface of triacetyl cellulose (trade name: Fuji Tac; produced by Fuji Photo Film Co., Ltd.) which is a transparent substrate having a film thickness of 80 $\mu$m, a transmittance of 92%, and refractive index of 1.49 by means of a reverse coating method, and this was then dried for 2 minutes at 100° C. Subsequently, the film was irradiated by UV radiation to cure the coating film, under the conditions of output powder: 120 W/cm, radiation distance (distance between the center of the lamp and the coating surface): 10 cm, treatment speed (speed with respect to the mercury lamp at the coating substrate): 5m/min, using one converging type high-pressure mercury lamp. Thus, a hard coat layer having a thickness of 5 $\mu$m and a refractive index of 1.65 was formed.

Subsequently, a fluorine-containing silica sol (trade name: LR 201; produced by Nissan Chemical Industries, Ltd.; total solid concentration: 4%, solvent: ethanol/butylcersorb=50/50) was coated on the hard coat layer by means of spin coating, as a coating material for an anti-reflection film. The coating was dried for one minute at 100° C. and was heat-cured for 6 hours at 120° C., thus producing an anti-reflection film having a thickness of 0.1 $\mu$m, a refractive index of 1.38, and a critical surface tension of 16 dyne/cm. As a result, an anti-reflection material according to the present invention having a reflectance of 0.8% was obtained.

<Composition of Dispersing Solution>

Antimony tin oxide (ATO) (primary particle size 10 nm), 30 parts

Dispersing agent (trade name: A-147; produced by Nippon Unicar Co., Ltd.), 3 parts Methylethylketone, 40 parts Methylisobutylketone, 60 parts <Composition of Base Coating Material for Hard Coat Layer>

A-1, 49 parts

B-1, 21 parts

Photopolyinerization initiator (trade name: Irgacure 184; produced by CIBA-GEIGY AG.), 5 parts Isopropyl alcohol, 80 parts Examples 2 to 13, and Comparative Example 1

Anti-reflection materials of Examples 2 to 13 according to the present invention, and Comparative Example 1, were obtained in the same manner as in Example 1, except that copolymer compositions of base coating materials for hard coat layers were changed to compositions shown in Table 1. There were also compositions to which were added DPPA or PPEA as a C component other than A and B components. Here, DPPA refers to mixtures of dipentaerythritol pentaacrylate and dipentaerythritol hexaacrylate (hydroxyl group value: 53 mg KOH/g), and PPEA refers to phenylphenoxyethanol acrylate.

Example 14

An anti-reflection material according to the present invention was obtained in the same manner as in Example 1, except that the composition of the coating material described below for an anti-reflection film was employed.

<Composition of Coating Material for Anti-reflection Film>

Silica sol (ethanol dispersing solution containing silica ultrafine particles having a particle size of 15 nm in an amount of 30% by weight converted into $SiO_2$), 10 parts Film forming agent Hydrolyzate of tetraethoxysilane (solid concentration of 6% converted into $SiO_2$), 15 parts Solvent Ethanol, 53 parts Comparative Example 2

A comparative anti-reflection material was obtained in the same manner as in Example 1, except that an anti-reflection film was not provided.

Comparative Example 3

A comparative anti-reflection material was obtained in the same manner as in Example 1, except that a hard coat layer was not provided.

Comparative Example 4

A comparative anti-reflection material was obtained in the same manner as in Comparative Example 1, except that a hard coat layer was formed by using a coating material for a hard coat layer in which only base coating material is employed without dispersing solution (only resins and no ATO).

With regard to the anti-reflection materials (10) obtained in Examples 1 to 14 and the comparative anti-reflection materials (10) obtained in Comparative Examples 1 to 4, reflectance, wear resistance, chemical resistance, critical surface tension, contamination resistance, and light resistance were measured and evaluated by the following methods. In the Comparative Example 2 in which an anti-reflection film is not provided, a surface of a hard coat layer was evaluated. In addition, each polarization film (20) having a construction shown in FIG. 2 was produced using the anti-reflection materials (10) of Examples 1 to 14 and the comparative anti-reflection materials (10) of Comparative Examples 1 to 4. Subsequently, the polarization film (20) was adhered to the glass base (33) as shown in FIG. 3 to produce a liquid crystal display (30). After the image size of each produced liquid crystal display (30) of the Examples 1 to 14 and the Comparative Examples 1 to 4, was set to, for example, 10.4 inches, the resolution was set to for example, 800×600 dots, and image contrast was evaluated according to the following method.

With regard to reflectance, a regular reflection at 5 degrees was measured with a wavelength ranging from 400 to 700 nm, using a spectrophotometer UV 3100 (produced by Shimadzu Corporation), and is shown as a Y value wherein visibility was corrected for according to Japanese Industrial Standarde Z8701. The measurement was carried out after the non-measured face was completely black-finished using a black marker. As a criteria of anti-reflectance, a case of 1.5% or less is extremely superior, and a case of above 4% is remarkably inferior.

With regard to wear resistance, a steel wool #0000 produced by Nihon Steel Wool Corporation was set in a plated-paper wear resistance tester (produced by Kumagaya Riki Industry Corporation), a surface of an anti-refection film of the anti-reflection material was reciprocated 50 times under a load of 200 g/cm², and subsequently, the change in the HAZE value, δH (according to the expression in the following) of the part was measured using a HAZE meter produced by Toyo Seiki Co., Ltd. In the case of where δH is 1.5 or less, wear resistance is superior, and in the case where δH is above 5, abrasions increased and wear resistance was inferior in practice. The measurement of the HAZE value was carried out using a simple substance of the anti-reflection material.

Change of HAZE value: δH=HAZE value after testing–HAZE value before testing

With regard to chemical resistance, a surface of the anti-reflection film was rubbed using a cotton swab (produced by Johnson and Johnson, Inc.) containing isopropyl alcohol 50 times, and subsequently, chemical resistance was evaluated with the criteria set as follows: a case where an extreme change such as peeling-off from the surface was observed: X, a case where no changes were observed: o, and the intermediate case: Δ.

Critical surface tension was calculated as follows: a contact angle with respect to water and methylene iodide on the surface of the anti-reflection film of the anti-reflection material was measured according to a Will Hermy method. The measured contact angle was substituted in the following expression described in "Base Science of Coating" (Yuji Harasaki, published by Maki Shoten), pp. 170 and 171. The critical surface tension was calculated from the $\gamma_{LV^\circ}$ value extrapolated in cos θ–1, using Zismam plotting.

$$\cos\theta - 1 = 1 + b(\gamma_C - \gamma_{LV^\circ})$$

with the proviso that $\gamma_{LV^\circ} \geq \gamma_c$ wherein θ: contact angle of solid/liquid, $\gamma_{LV^\circ}$: surface tension of liquid, $\gamma_c$: critical surface tension, and b: constant.

With regard to contamination resistance, after a drop of rapeseed oil was dropped on the surface of the anti-reflection film, the dropped rapeseed oil was rubbed 20 times using Bencott produced by Ashahi Chemical Industry Co., Ltd., containing ligroin. After that, an SEM photograph was taken of the the wiped surface, and subsequently the existence of cracks on the surface or adhesion of fibers of the Bencott was observed. The contamination resistance was evaluated by criteria as follows: a case where the existence of cracks on the surface or adhesion of the fiber of the Bencott was extremely: X, a case where there were no changes: ○, and the intermediate case: Δ.

After testing for 200 hours by a fade meter produced by Suga Testing Machine Corporation, appearance of the anti-reflection film was observed by visual inspection. The light resistance was evaluated by criteria as follows: a case where there was no change in the appearance: ○, a case where slight change was observed in the appearance: Δ, and a case where extreme change was observed in the appearance: X.

Figure 5:
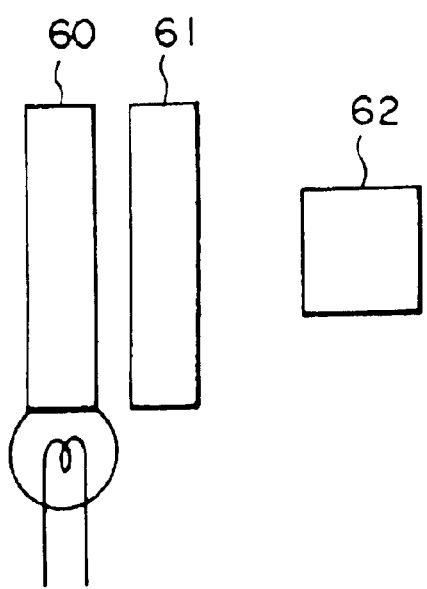
FIG. 5 is a schematic drawing showing an arrangement of an apparatus for measuring image contrast.

Image contrast was evaluated according to a contrast ratio measuring method of a liquid crystal display panel in Japanese Industrial Standard C7072 1988. In the evaluation of image contrast, the arrangement of a light source (60)—liquid crystal panel (61)—measuring apparatus (62) is shown in FIG. 5. In this case, the distance between the light source (60) and the liquid crystal panel (61) was set at, for example, 1 cm, and the distance between the liquid crystal panel (61) and the measuring apparatus (62) was set at, for example, 50 cm, and an angular aperture of the measuring apparatus was set at for example, 5 degrees. As the light source, an EL of 5 W was employed, and as the measuring apparatus, LS-100 produced by Minolta Camera Co., Ltd., was employed. Image contrast was evaluated according to criteria set as follows: CR=3 or more: ○, CR=2 or more and less than 3: Δ, and CR=less than 2: X.

The results of the above are shown in Table 1.

TABLE 1

| | Copolymer Component | | | Weight Ratio (A/B/C) | Refractive Index of Hard Coating Layer | Reflectance |
| | A Component | B Component | C Component | | | |
|---|---|---|---|---|---|---|
| Example 1 | A-1 | B-1 | — | 70/30/0 | 1.65 | 0.8 |
| Example 2 | A-1 | B-2 | — | 60/40/0 | 1.62 | 0.9 |
| Example 3 | A-1 | B-3 | — | 60/40/0 | 1.62 | 1.0 |
| Example 4 | A-1 | B-4 | — | 60/40/0 | 1.62 | 1.0 |
| Example 5 | A-1 | B-5 | — | 60/40/0 | 1.62 | 1.0 |
| Example 6 | A-1 | B-6 | — | 60/40/0 | 1.62 | 0.9 |
| Example 7 | A-1 | B-7 | — | 60/40/0 | 1.62 | 1.0 |
| Example 8 | A-1 | B-8 | — | 60/40/0 | 1.62 | 1.0 |
| Example 9 | A-2 | B-8 | — | 60/40/0 | 1.62 | 1.0 |
| Example 10 | A-1 | B-1 | DPPA | 70/20/10 | 1.65 | 0.9 |
| Example 11 | A-1 | — | — | 100/0/0 | 1.68 | 0.8 |
| Example 12 | A-1 | — | PPEA | 60/0/40 | 1.62 | 1.0 |
| Example 13 | A-1 | — | DPPA | 50/0/50 | 1.59 | 1.3 |
| Example 14 | A-1 | B-1 | — | 70/30/0 | 1.65 | 0.9 |
| Comparative Example 1 | — | B-1 | PPEA | 0/60/40 | 1.58 | 1.8 |
| Comparative Example 2 | A-1 | B-1 | — | 70/30/0 | 1.65 | 5.5 |
| Comparative Example 3 | — | — | — | — | — | 2.2 |
| Comparative Example 4 | — | B-1 | PPEA | 0/60/40 | 1.52 | 2.3 |

| | Wear Resistance | Chemical Resistance | Critical Surface Tension (dyn/cm) | Contamination Resistance | Light Resistance | Image Contrast |
|---|---|---|---|---|---|---|
| Example 1 | 0.3 | ○ | 16 | ○ | ○ | ○ |
| Example 2 | 0.4 | ○ | 17 | ○ | ○ | ○ |
| Example 3 | 0.2 | ○ | 15 | ○ | ○ | ○ |
| Example 4 | 0.5 | ○ | 15 | ○ | ○ | ○ |
| Example 5 | 0.5 | ○ | 18 | ○ | ○ | ○ |
| Example 6 | 0.6 | ○ | 16 | ○ | ○ | ○ |
| Example 7 | 0.8 | ○ | 16 | ○ | ○ | ○ |
| Example 8 | 0.7 | ○ | 16 | ○ | ○ | ○ |
| Example 9 | 0.7 | ○ | 15 | ○ | ○ | ○ |
| Example 10 | 0.9 | ○ | 19 | ○ | ○ | ○ |
| Example 11 | 2.0 | ○ | 15 | ○ | ○ | ○ |
| Example 12 | 3.5 | ○ | 17 | ○ | ○ | ○ |
| Example 13 | 2.8 | ○ | 15 | ○ | ○ | ○ |
| Example 14 | 0.8 | ○ | 39 | Δ | ○ | ○ |
| Comparative Example 1 | 0.8 | ○ | 15 | ○ | ○ | Δ |
| Comparative Example 2 | 0.5 | ○ | 43 | X | ○ | X |
| Comparative Example 3 | 28.5 | X | 18 | ○ | ○ | ○ |
| Comparative Example 4 | 0.9 | ○ | 15 | ○ | ○ | Δ |

As is apparent from the results shown in Table 1, all anti-reflection materials according to the present invention exhibit superior properties such as reflectance, durability, etc. In contrast, all comparative anti-reflection materials according to the Comparative Examples 1 to 4 have problems in reflectance. In addition, the Comparative Examples 1 and 4 were inferior in image contrast, the Comparative Example 2 was inferior in contamination resistance and image contrast, and the Comparative Example 3 was inferior in durability. Therefore, these comparative anti-reflection materials could not be used in practice.

② Second Embodiment

<Synthesis of Urethane(metha)acrylate>

Synthesis Example 1

940 g of mixture of pentaerythritol triacrylate and pentaerythritol tetraacrylate (hydroxyl group value of 120 mg KOH/g, hereinafter referred to as PETA), 168 g of hexamethylene diisocyanate (hereinafter referred to as HDI), and several drops of dibutyl tin dilaurate (hereinafter referred to as DBTL) were mixed, and this was heated to 80° C. and was reacted for about 5 hours. Urethane acrylate of synthesis example 1 was thereby obtained.

Synthesis Example 2

2200 g of mixture of dipentaerythritol pentaacrylate and dipentaerythritol hexaacrylate (hydroxyl group value of 53 mg KOH/g, hereinafter referred to as DPPA), 168 g of HDI, and several drops of DBTL were mixed, and this was heated to 80° C. and was reacted for about 7 hours. Urethane acrylate of synthesis example 2 was thereby obtained.

Synthesis Example 3

Synthesis was carried out in the same manner as in Synthesis example 1, except that 174 g of 2,4-tolylene diisocyanate was employed instead of 168 g of HDI, and urethane acrylate of synthesis example 3 was thereby obtained.

Synthesis Example 4

Synthesis was carried out in the same manner as in Synthesis example 1, except that 250 g of 4,4'-diphenylmethane diisocyanate (hereinafter referred to as MDI) was employed instead of 168 g of HDI, and urethane acrylate of synthesis example 4 was thereby obtained.

Synthesis Example 5

Synthesis was carried out in the same manner as in Synthesis example 1, except that 188 g of xylylene diisocyanate was employed instead of 168 g of HDI, and urethane acrylate of synthesis example 5 was thereby obtained.

Synthesis Example 6

3200 g of DPPA, 666 g of nulate compound of isophorone diisocyanate, and several drops of DBTL were mixed, and this was heated to 80° C. and was reacted for about 7 hours. Urethane acrylate of synthesis example 6 was thereby obtained.

Synthesis Example 7

438 g of bisphenoxyethanol fluorene, 500 g of MDI, and several drops of DBTL were mixed, and this was heated to 80° C. and was reacted for about 3 hours. Next, 2350 g of DPPA was added thereto, and this was further reacted at 80° C. for about 6 hours. Urethane acrylate of synthesis example 7 was thereby obtained.

Synthesis Example 8

134 g of dimethylol propionic acid, 500 g of MDI, and several drops of DBTL were mixed, and this was heated to 80° C. and was reacted for about 6 hours. Next, 1050 g of PETA was added thereto, and this was further reacted at 80° C. for about 6 hours. Urethane acrylate of synthesis example 8 was thereby obtained.

Example 15

A coating material consisting of the composition below was stirred for 15 minutes using a disper. The mixed coating material was coated on one surface of triacetyl cellulose (trade name: Fuji Tac UVD80; produced by Fuji Photo Film Co., Ltd; refractive index: 1.49) which is a transparent substrate having a film thickness of 80 µm, and a transmittance of 92%, by means of a reverse coating method, and this was then dried for 2 minutes at 100° C. Subsequently, the film was irradiated by UV radiation to cure the coating film, under the conditions of output powder: 120 W/cm, radiation distance (distance between the center of the lamp and the coating surface): 10 cm, treatment speed (speed with respect to the mercury lamp at the coating substrate): 5m/min, using one converging type high-pressure mercury lamp. Thus, a hard coat layer having a thickness of 1.7 µm and a refractive index of 1.53 was formed. Subsequently, a fluorine-containing silica sol (trade name: LR 201; produced by Nissan Chemical Industries, Ltd.; total solid concentration: 4%, solvent: ethanol/butylcersorb=50/50) was coated on the hard coat layer by means of spin coating. The coating was dried for one minute at 100° C. and was heat-cured for 6 hours at 120° C., thus producing an anti-reflection film having a thickness of 0.1 µm, a refractive index of 1.38, and a critical surface tension of 11 dyne/cm. As a result, an anti-reflection material according to the present invention having a reflectance of 1.4% was obtained.

<Composition of Coating Material>

Complex colloidal sol of rutile-type titanium dioxide and zirconium dioxide (total solid concentration: 20%, solvent: methanol, average particle size: 10 to 15 nm, refractive index: 2.05, weight ratio of $TiO_2$ to $ZrO_2$: 100/20), 225 parts Urethane acrylate of Synthesis Example 1, 48 parts Polymerization Initiator (trade name: Irgacure #1800; produced by CIBA Speciality Chemical Co., Ltd.), 7 parts Isopropyl alcohol, 50 parts Examples 16 to 22

Anti-reflection materials of Examples 16 to 22 according to the present invention were obtained in the same manner as in Example 15, except that urethane acrylate of Synthesis Example 1 in coating materials for hard coat layers was changed to each one of urethane acrylates of Synthesis Examples 2 to 8.

Comparative Example 5

A hard coat layer having a thickness of 3.0 µm was formed in the same manner as in Example 15, except that urethane acrylate in coating material for the hard coat layer was changed to polyester resin (trade name: Bylon 200; produced by Toyobo Co., Ltd.), and isopropyl alcohol was changed to a mixed solvent of methylethylketone and toluene (1/1), and a comparative anti-reflection material was thereby obtained. The comparative anti-reflection material had a reflectance of 2.1% and a critical surface tension of 14 dyne/cm.

Comparative Example 6

A hard coat layer having a thickness of 3.0 µm was formed in the same manner as in Example 15, except that filler (sol) of the hard coat layer was changed to the pigment below, and a comparative anti-reflection material was thereby obtained. The comparative anti-reflection material had a reflectance of 2.7% and a critical surface tension of 13 dyne/cm.

Silica sol (trade name: Organo Silica Sol MIBK-ST; produced by Nissan Chemical Industries, Ltd.; solid concentration: 30%)

Comparative Example 7

A hard coat layer having a thickness of 3.0 µm was formed in the same manner as in Example 15, except that filler (sol)

was not employed in the hard coat layer, and a comparative anti-reflection material was thereby obtained. The comparative anti-reflection material had a reflectance of 2.2% and a critical surface tension of 18 dyne/cm.

Comparative Example 8

A triacetyl cellulose having a thickness of 80 μm, and a transmittance of 92%, was employed as a comparative anti-reflection material. The comparative anti-reflection material had a critical surface tension of 36 dyne/cm.

With regard to the anti-reflection materials (10) obtained in Examples 15 to 22 and the comparative anti-reflection materials (10) obtained in Comparative Examples 5 to 8, reflectance, wear resistance, chemical resistance, critical surface tension, contamination resistance, and light resistance were measured and evaluated by the same methods as the first embodiment. In the Comparative Example 8 in which an anti-reflection film is not provided, a surface of the hard coat layer was evaluated. In addition, each polarization film (20) having a construction shown in FIG. 2 was produced using the anti-reflection materials (10) of Examples 15 to 22 and the comparative anti-reflection materials (10) of Comparative Examples 5 to 8. Subsequently, the polarization film (20) was adhered to the glass base (33) as shown in FIG. 3 to produce a liquid crystal display (30). Using each produced liquid crystal display (30) of the Examples 15 to 22 and the Comparative Examples 5 to 8, image contrast was evaluated by the same methods as in the first embodiment.

The evaluated results are shown in Table 2.

③ Third Embodiment

Example 23

A coating material for a hard coat layer consisting of the composition below was stirred for 15 minutes using a disper. The mixed coating material was coated on one surface of triacetyl cellulose (trade name: Fuji Tac UVD80; produced by Fuji Photo Film Co., Ltd.) which is a transparent substrate having a film thickness of 80 μm, a transmittance of 92%, and a refractive index of 1.49, by means of a reverse coating method, and was then dried for 2 minutes at 100° C. Subsequently, the film was irradiated by UV radiation to cure the coating film, under the conditions of output powder: 120 W/cm, radiation distance (distance between the center of the lamp and the coating surface): 10 cm, treatment speed (speed with respect to the mercury lamp at the coating substrate): 5m/min, using one converging type high-pressure mercury lamp. Thus, a hard coat layer having a thickness of 5 μm and a refractive index of 1.62 was formed. Subsequently, a fluorine-containing silica sol (trade name: LR 201; produced by Nissan Chemical Industries, Ltd.; total solid concentration: 4%, solvent: ethanol/butylcersorb=50/50) was coated on the hard coat layer by means of spin coating. The coating was dried for one minute at 100° C. and was heat-cured for 6 hours at 100° C., thus producing an anti-reflection film having a thickness of 0.1 μm, a refractive index of 1.38, and a critical surface tension of 11 dyne/cm. As a result, an anti-reflection material according to the present invention was obtained.

<Composition of Coating Material for Hard Coat Layer>

Titanium oxide ultrafine particles in which rutile-type titanium dioxide is surface-treated by zirconium diox-

TABLE 2

|  | Reflectance (%) | Wear Resistance (×10⁻²) | Chemical Resistance | Critical Surface Tension (dyn/cm) | Contamination Resistance | Light Resistance | Image Contrast |
|---|---|---|---|---|---|---|---|
| Example 15 | 1.4 | 2.8 | ○ | 11 | ○ | ○ | ○ |
| Example 16 | 1.3 | 1.6 | ○ | 11 | ○ | ○ | ○ |
| Example 17 | 1.3 | 0.6 | ○ | 11 | ○ | ○ | ○ |
| Example 18 | 1.6 | 0.7 | ○ | 18 | ○ | ○ | ○ |
| Example 19 | 1.0 | 0.8 | ○ | 15 | ○ | ○ | ○ |
| Example 20 | 1.2 | 1.2 | ○ | 12 | ○ | ○ | ○ |
| Example 21 | 1.1 | 1.4 | ○ | 14 | ○ | ○ | ○ |
| Example 22 | 1.5 | 0.9 | ○ | 15 | ○ | ○ | ○ |
| Comparative Example 5 | 2.1 | 27.0 | Δ | 14 | ○ | ○ | Δ |
| Comparative Example 6 | 2.7 | 10.2 | ○ | 13 | ○ | ○ | Δ |
| Comparative Example 7 | 2.2 | 0.9 | ○ | 18 | ○ | ○ | Δ |
| Comparative Example 8 | 4.3 | 48.0 | X | 36 | X | ○ | ○ |

As is apparent from the results shown in Table 2, all anti-reflection materials according to the present invention exhibit superior properties such as reflectance and durability. In contrast, all comparative anti-reflection materials have problems in reflectance. In addition, the Comparative Examples 5 and 7 were inferior in image contrast, the Comparative Examples 5, 6, and 8 were inferior in wear resistance, the Comparative Examples 5 and 8 were inferior in chemical resistance, and the Comparative Example 8 was inferior in contamination resistance. Therefore, these comparative anti-reflection materials could not be used in practice.

ide (total solid concentration: 20%, solvent: methanol, average particle size: 10 to 15 nm, refractive index: 2.05, weight ratio of titanium dioxide to zirconium dioxide ($TiO_2/ZrO_2$): 100/20), 225 parts Urethane acrylate Urethane acrylate in which 200 g of mixture of dipentaerythritol pentaacrylate and dipentaerythritol hexaacrylate (hydroxyl group value of 53 mg KOH/g, hereinafter referred to as DPPA), 168 g of hexamethylene diisocyanate (hereinafter referred to as HDI), and several drops of dibutyl tin dilaurate (hereinafter referred to as DBTL) were mixed, and this was heated to 80° C. and was reacted for about 7 hours, 48 parts Polymerization Initiator (trade name: Irgacure #1800; produced by CIBA Speciality Chemical Co., Ltd.), 7 parts Isopropyl alcohol, 50 parts

Example 24

A anti-reflection material according to the present invention was obtained in the same manner as in Example 23, except that urethane acrylate in the coating material for the hard coat layer was changed to urethane acrylate in which 940 g of mixture of pentaerythritol triacrylate and pentaerythritol tetraacrylate (hydroxyl group value of 120 mg KOH/g, hereinafter referred to as PETA), 168 g of HDI, and several drops of DBTL were mixed, and this was heated to 80 and was reacted for about 5 hours.

Example 25

A anti-reflection material according to the present invention was obtained in the same manner as in Example 23, except that titanium oxide ultrafine particles in the coating material for the hard coat layer was changed to a rutile-type titanium dioxide surface-treated by silica (total solid concentration: 20%, solvent: methanol, average particle size: 10 nm, refractive index: 2.10, weight ratio of titanium dioxide to silicon dioxide ($TiO_2/SiO_2$): 100/15). The hard coat layer had a refractive index of 1.67.

Example 26

A anti-reflection material according to the present invention was obtained in the same manner as in Example 23 other than the composition of the coating material for the hard coat layer was changed to the following. The hard coat layer had a thickness of 7 μm and a refractive index of 1.60.

<Composition of Coating Material for Hard Coat Layer>

Titanium oxide ultrafine particles in which a rutile-type titanium dioxide is surface-treated by zirconium dioxide (total solid concentration: 20%, solvent: methanol, average particle size: 10 to 15 nm, refractive index: 2.05, weight ratio of titanium dioxide to zirconium dioxide ($TiO_2/ZrO_2$): 100/20), 100 parts Urethane acrylate Urethane acrylate in which 2200 g of DPPA, 168 g of HDI, and several drops of DBTL were mixed, and this was heated to 80° C. and was reacted for about 7 hours, 42 parts Diacrylate Diacrylate in which 600 g of bisphenoxyethanol fluorene (trade name: BPEF; produced by Osaka Gas Chemical Co., Ltd.), 258 g of acrylic acid, 30 g of p-toluenesulfonic acid, 1350 g of toluene, 1 g of hydroquinone monomethylether, and 0.03 g of hydroquinone were mixed; the dehydration esterification reaction was carried out on the mixture under refluxing at 100 to 115° C., until the theoretical anhydrous amount was obtained; the reacted solution was neutralized by alkali and was washed by a 10% salt solution; and toluene was removed, 42 parts Polymerization Initiator (trade name: Irgacure #1800; produced by CIBA Speciality Chemical Co., Ltd.), 6 parts Isopropyl alcohol, 50 parts

Example 27

A anti-reflection material according to the present invention was obtained in the same manner as in Example 23, except that the transparent substrate was changed to a PET having a thickness of 75 μm (trade name: A4300; produced by Toyobo Co., Ltd.) instead of TAC.

Comparative Example 9

A comparative anti-reflection material was obtained in the same manner as in Example 23, except that the composition of the coating material for the hard coat layer was changed to the following. The hard coat layer had a refractive index of 1.53.

<Composition of Coating Material for Hard Coat Layer>

UV-curing resin (trade name; Unidick 17-806; produced by Dainippon Ink and Chemicals Inc.; solid concentration: 80%, diluted in ethyl acetate), 119 parts Polymerization Initiator (trade name: Irgacure #184; produced by CIBA Speciality Chemical Co., Ltd.), 5 parts Isopropyl alcohol, 160 parts

Comparative Example 10

A comparative anti-reflection material was obtained in the same manner as in Example 23, except that a hard coat layer was not provided.

Comparative Example 11

A comparative anti-reflection material was obtained in the same manner as in Example 23, except that the composition of the coating material for the hard coat layer was changed to the following. The hard coat layer had a refractive index of 1.70.

<Composition of Coating Material for Hard Coat Layer>

Anatase-type titania sol (solid concentration: 20%, solvent: methanol, average particle size: 7 nm, refractive index: 2.3), 175 parts UV-curing resin (trade name: Unidick 17-806; produced by Dainippon Ink and Chemicals Inc.; solid concentration: 80%, diluted in ethyl acetate), 75 parts Polymerization Initiator (trade name: Irgacure #1800; produced by CIBA Speciality Chemical Co., Ltd.), 5 parts Isopropyl alcohol, 30 parts

Comparative Example 12

A comparative anti-reflection material Was obtained in the same manner as in Example 23, except that an anti-reflection film was not provided.

With regard to the anti-reflection materials obtained in Examples 23 to 27 and the comparative anti-reflection materials obtained in Comparative Examples 9 to 12, reflectance, wear resistance, chemical resistance, critical surface tension, contamination resistance, and light resistance were measured and evaluated by the same methods as in the first embodiment. In the Comparative Example 12 in which an anti-reflection film is not provided, a surface of the hard layer was evaluated. In addition, each polarization film (20) having a construction shown in FIG. 2 was produced using the anti-reflection materials (10) of Examples 23 to 27 and the comparative anti-reflection materials (10) Comparative Examples 9 to 12. Subsequently, the polarization film (20) was adhered to the glass base (33) as shown in FIG. 3 to display (30). Using each produced liquid crystal display (30) of the Examples 23 to 27 and the Comparative Examples 9 to 12, image contrast was evaluated by the same methods as in the first embodiment.

The evaluated results are shown in Table 3.

TABLE 3

| | Reflectance (%) | Wear Resistance | Chemical Resistance | Critical Surface Tension (dyn/cm) | Contamination Resistance | Light Resistance | Image Contrast |
|---|---|---|---|---|---|---|---|
| Example 23 | 1.3 | 0.3 | ○ | 16 | ○ | ○ | ○ |
| Example 24 | 1.2 | 0.4 | ○ | 17 | ○ | ○ | ○ |
| Example 25 | 1.0 | 0.2 | ○ | 15 | ○ | ○ | ○ |
| Example 26 | 1.4 | 0.5 | ○ | 15 | ○ | ○ | ○ |
| Example 27 | 1.2 | 0.5 | ○ | 18 | ○ | ○ | ○ |
| Comparative Example 9 | 2.1 | 0.2 | ○ | 15 | ○ | ○ | Δ |
| Comparative Example 10 | 2.3 | 10.2 | X | 17 | ○ | ○ | Δ |
| Comparative Example 11 | 0.8 | 0.3 | ○ | 15 | ○ | X | ○ |
| Comparative Example 12 | 5.8 | 0.2 | ○ | 39 | X | ○ | X |

As is apparent from the results shown in Table 3, all anti-reflection materials according to the present invention exhibit superior properties. In contrast, comparative anti-reflection materials of the Comparative Examples 9, 10 and 12 have problems in reflectance and image contrast. In addition, the Comparative Example 10 was inferior in wear resistance and chemical resistance, the Comparative Example 12 has problems in contamination resistance since the critical surface tension is large. Furthermore, the Comparative Example 11 was inferior in light resistance. Therefore, these comparative anti-reflection materials could not be used in practice.

As explained above, according to the present invention, an anti-reflection material and a polarization film which exhibit superior anti-reflection properties by preventing external light such as sunlight, fluorescent light, etc., from reflecting on a display, which yields a clear image without sparkling and reduction of image contrast, and which exhibits superior wear resistance, chemical resistance, contamination resistance, and light resistance, as well as exhibits optical stability, can be provided.

What is claimed is:

1. An anti-reflection material comprising a transparent substrate, a hard coat layer provided on one surface or two surfaces of said transparent substrate directly or via another layer, and an anti-reflection film having a lower refractive index than said hard coat layer further provided on a surface of said hard coat layer, wherein said hard coat layer comprises a copolymer of at least a (meth)acrylate compound having a fluorene structure and a urethane(meth)acrylate compound having the chemical formula

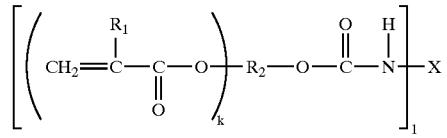

wherein $R_1$ is hydrogen or methyl; $R_2$ is a compound excluding hydroxyl groups from a polyhydric alcohol; X is a component, excluding isocyanate groups, from an organic isocyanate compound; k is an integer of 1 to 5; and 1 is an integer of 1 to 3, with the proviso that k and I cannot both be 1.

2. An anti-reflection material as recited in claim 1, wherein said hard coat layer comprises a filler having a refractive index of 1.6 to 2.7.

3. An anti-reflection material as recited in claim 1, wherein said anti-reflection film has a critical surface tension of 20 dynes/cm or less.

4. A polarization film wherein a protecting layer is laminated on the opposite side of the surface of said transparent substrate of said anti-reflection material as recited in claim 1 in which said hard coat and said anti-reflection film are provided, via a polarization substrate.

* * * * *